(12) United States Patent
Matsumoto

(10) Patent No.: US 8,374,002 B2
(45) Date of Patent: Feb. 12, 2013

(54) ISOLATED SWITCHING POWER SUPPLY APPARATUS

(75) Inventor: Tadahiko Matsumoto, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 145 days.

(21) Appl. No.: 13/081,529

(22) Filed: Apr. 7, 2011

(65) Prior Publication Data

US 2012/0081927 A1   Apr. 5, 2012

(30) Foreign Application Priority Data

Apr. 8, 2010   (JP) ................................. 2010-089589

(51) Int. Cl.
*H02M 3/335* (2006.01)
(52) U.S. Cl. ..................... 363/21.01; 363/95; 363/21.08; 363/21.16
(58) Field of Classification Search ......... 363/20–21.18, 363/84, 95
See application file for complete search history.

(56) References Cited

U.S. PATENT DOCUMENTS

| | | | | |
|---|---|---|---|---|
| 4,683,528 A | * | 7/1987 | Snow et al. ................. | 363/21.15 |
| 5,841,641 A | * | 11/1998 | Faulk .......................... | 363/21.14 |
| 6,301,135 B1 | * | 10/2001 | Mammano et al. ............. | 363/95 |
| 7,209,372 B2 | * | 4/2007 | Jang et al. ................... | 363/21.14 |
| 7,821,797 B2 | * | 10/2010 | Nishiyama et al. ............. | 363/17 |
| 2007/0153554 A1 | | 7/2007 | Matsumoto | |
| 2009/0161391 A1 | | 6/2009 | Matsumoto | |

FOREIGN PATENT DOCUMENTS

| | | |
|---|---|---|
| JP | 10-052061 A | 2/1998 |
| JP | 2002-272097 A | 9/2002 |
| JP | 2007-209082 A | 8/2007 |
| WO | 2007/018227 A1 | 2/2007 |
| WO | 2008/041399 A1 | 4/2008 |

\* cited by examiner

*Primary Examiner* — Jessica Han
(74) *Attorney, Agent, or Firm* — Keating & Bennett, LLP

(57) ABSTRACT

An isolated switching power supply apparatus includes a direct-current input power supply, a power transmission transformer including a primary winding and a secondary winding, at least one main switching element configured to perform switching control on a direct-current voltage applied to the primary winding of the power transmission transformer, a rectification circuit that includes at least one rectification switching element and is connected to the secondary winding of the power transmission transformer, a smoothing circuit connected to the secondary winding of the power transmission transformer, a power conversion circuit configured to obtain an output voltage from the smoothing circuit, and a control circuit configured to control an operation of the power conversion circuit.

12 Claims, 31 Drawing Sheets

OPERATION IN PERIOD
FROM TIME T0 TO TIME T1

OPERATION AT TIME T2

OPERATION IN PERIOD
FROM TIME T2 TO TIME T3

OPERATION IN PERIOD
FROM TIME T3 TO TIME T4

OPERATION IN PERIOD
FROM TIME T4 TO TIME T5

OPERATION AT TIME T6

OPERATION IN PERIOD
FROM TIME T6 TO TIME T7

OPERATION IN PERIOD
FROM TIME T7 TO TIME T8

OPERATION IN PERIOD
FROM TIME T0 TO TIME T1

OPERATION AT TIME T1

OPERATION IN PERIOD
FROM TIME T1 TO TIME T2

OPERATION IN PERIOD FROM TIME T3 TO TIME T4

OPERATION AT TIME T5

OPERATION IN PERIOD
FROM TIME T5 TO TIME T6

OPERATION IN PERIOD
FROM TIME T6 TO TIME T7

ISOLATED SWITCHING POWER SUPPLY APPARATUS

BACKGROUND OF THE INVENTION

1. Field of the Invention

The present invention relates to a digital control circuit that performs bidirectional communication between a primary side and a secondary side, driving of a switching element with a low loss, and acquisition of power from a path for the bidirectional communication, and a switching power supply apparatus including the digital control circuit.

2. Description of the Related Art

In isolated switching power supply apparatuses, in order to use different ground potentials in a primary circuit and a secondary circuit and satisfy a safety standard, a primary side and a secondary side are isolated using a transformer. In order to control an output voltage and an output current of the secondary side, the output voltage and the output current of the secondary side are detected and are then fed back to the primary side and a switching circuit on the primary side is controlled on the basis of the detected output voltage and the detected output current. At that time, a feedback circuit also needs to achieve the isolation between the primary side and the secondary side.

When a synchronous rectification circuit is used on the secondary side, in order to prevent a case in which a main switch and a commutator-side synchronous rectifier are turned on at the same time and a flow-through current flows, it is necessary to turn off the commutator-side synchronous rectifier in a secondary-side synchronous rectification circuit immediately before the main switch is turned on. Accordingly, a signal indicating a time immediately before the main switch is turned on must be transmitted from a primary side to the secondary side so as to control a time of switching performed by the secondary-side synchronous rectification circuit (see Japanese Unexamined Patent Application Publication No. 2002-272097). FIG. 1 illustrates a basic configuration of an isolated DC-DC converter disclosed in Japanese Unexamined Patent Application Publication No. 2002-272097.

Referring to FIG. 1, a main switch 2 is subjected to switching control in accordance with a control signal output from a primary-side control unit 5. The primary-side control unit 5 detects an output voltage Vo via an isolation circuit 10 and outputs a control signal C1 for controlling a duty ratio of the main switch 2 on the basis of the output voltage Vo. The control signal C1 is also transmitted to a secondary side via driving circuits 7 and 8 and a transformer 9 and becomes a control signal C2. The control signal C2 is supplied to a secondary-side control unit 21. The control signal C2 is transmitted from the secondary-side control unit 21 to an input terminal of a driving circuit 13 and a gate electrode of a transistor 15. As a result, a rectifier-side synchronous rectifier 3 is driven in phase with the main switch 2, and a commutator-side synchronous rectifier 4 is driven in opposite phase with the main switch 2.

A time difference between the control signals C1 and C2 that is caused by the driving circuits 7 and 8 and the transformer 9 and a delay time of turning off of an MOSFET in the commutator-side synchronous rectifier are adjusted by a delay circuit 11 for delaying turning on of the main switch.

As illustrated in FIG. 1, when a synchronous rectification circuit is used on the secondary side, at least two units including a unit for feeding back an output voltage detection signal to the primary side are needed to transmit a signal between the primary side and the secondary side while insulating the primary side and the secondary side from each other. As a result, a circuit configuration therefore becomes complicated.

When the main switch and the synchronous rectifier on the secondary side are MOSFETs, an electric charge stored in an input capacitor is discharged every switching period. Accordingly, the larger the die size of a MOSFET and the higher a switching frequency, the larger a driving loss.

In recent years, ICs including a digital control circuit have been used. In order to achieve a low-loss digital control circuit, a voltage for driving the digital control circuit is generally lower than a voltage for driving a main switch. For example, a driving voltage for a main switch is approximately 10 V, and a driving voltage for a digital control IC is approximately 2 V. When a linear regulator or the like is used to obtain two driving voltages from a single power supply voltage, the conduction loss of the linear regulator becomes pronounced. When a switching regulator for supplying a driving voltage to a digital control circuit is used, a circuit configuration becomes complicated.

SUMMARY OF THE INVENTION

Preferred embodiments of the present invention provide a digital control circuit that performs bidirectional communication between a primary side and a secondary side, driving of a switching element with a low loss, and acquisition of power for a digital control circuit from a path for the bidirectional communication, and also provide a switching power supply apparatus including the digital control circuit.

An isolated switching power supply apparatus according to a preferred embodiment of the present invention includes a direct-current input power supply, a power transmission transformer including a primary winding and a secondary winding, at least one main switching element configured to perform switching control on a direct-current voltage applied to the primary winding of the power transmission transformer, a rectification circuit that includes at least one rectification switching element and is connected to the secondary winding of the power transmission transformer, a smoothing circuit connected to the secondary winding of the power transmission transformer, a power conversion circuit configured to obtain an output voltage from the smoothing circuit, and a control circuit configured to control an operation of the power conversion circuit. An input/output conversion ratio is controlled in accordance with a duty ratio of the main switching element. The control circuit includes a timing signal transmission transformer that is connected between a primary controller and a secondary controller and includes a primary winding and a secondary winding. The primary controller includes at least one primary drive switch configured to drive the timing signal transmission transformer, a primary digital control unit configured to control a time of driving of the primary drive switch, and a primary winding voltage detection unit configured to detect a change in voltage output from the timing signal transmission transformer. The secondary controller includes at least one secondary drive switch configured to drive the timing signal transmission transformer, a secondary digital control unit configured to control a time of driving of the secondary drive switch, and a secondary winding voltage detection unit configured to detect a change in voltage output from the timing signal transmission transformer. A pulse signal is generated by the primary drive switch or the secondary drive switch when or immediately before the main switching element is turned on or off, and is transmitted from one of a primary circuit and a secondary circuit to the other one of the primary circuit and the secondary circuit by the timing signal transmission transformer. The primary drive switch, the secondary drive switch, and the timing signal transmission transformer define an auxiliary switching power supply circuit, the timing signal transmission transformer functions as a reactance element in the auxiliary switching power supply circuit, and the auxiliary switching power supply circuit performs voltage conversion or regeneration of driving energy of the main switching element.

The primary controller or the secondary controller includes a first direct-current voltage portion and a second direct-current voltage portion having different voltage values. A direct-current voltage is supplied from the first direct-current voltage portion to the auxiliary switching power supply circuit, is subjected to voltage conversion in the auxiliary switching power supply circuit, and is input into the second direct-current voltage portion.

A lower one of voltages at the first direct-current voltage portion and the second direct-current voltage portion is supplied to the primary digital control unit or the secondary digital control unit.

The main switching element is connected to the primary controller. The rectification switching element is connected to the secondary controller. At least one of the main switching element and the rectification switching element is a field effect transistor. The auxiliary switching power supply circuit regenerates at least a portion of driving energy of the main switching element or the rectification switching element by performing voltage resonant switching.

The primary controller includes a first series circuit and a second series circuit. The first series circuit includes a first switching circuit and a second switching circuit. The second series circuit includes a third switching circuit and a fourth switching circuit. The primary digital control unit controls turning on/off of the first to fourth switching circuits. One end of the first series circuit is connected to the first direct-current voltage portion, and the other end of the first series circuit is connected to a reference potential of a predetermined primary circuit. One end of the second series circuit is connected to the second direct-current voltage portion, and the other end of the second series circuit is connected to the reference potential of the predetermined primary circuit. The primary winding of the timing signal transmission transformer is connected between a node between the first switching circuit and the second switching circuit and a node between the third switching circuit and the fourth switching circuit.

The secondary controller includes a third series circuit and a fourth series circuit. The third series circuit includes a fifth switching circuit and a sixth switching circuit. The fourth series circuit includes a seventh switching circuit and an eighth switching circuit. The secondary digital control unit controls turning on/off of the fifth to eighth switching circuits. One end of the third series circuit is connected to a third direct-current voltage portion, and the other end of the third series circuit is connected to a reference potential of a predetermined secondary circuit. One end of the fourth series circuit is connected to a fourth direct-current voltage portion, and the other end of the fourth series circuit is connected to the reference potential of the predetermined secondary circuit. The secondary winding of the timing signal transmission transformer is connected between a node between the fifth switching circuit and the sixth switching circuit and a node between the seventh switching circuit and the eighth switching circuit.

A series circuit including a first diode and a ninth switching circuit is connected between a fifth direct-current voltage portion and the node between the first switching circuit and the second switching circuit. While driving energy for the main switching element is regenerated, power to be regenerated is obtained from the series circuit and is supplied to the fifth direct-current voltage portion.

A series circuit including a second diode and a tenth switching circuit is connected between a sixth direct-current voltage portion and the node between the fifth switching circuit and the sixth switching circuit. While driving energy for the rectification switching element is regenerated, power to be regenerated is obtained from the series circuit and is supplied to the sixth direct-current voltage portion.

Power obtained from the fifth direct-current voltage portion is used as driving power for the digital control unit in the primary controller.

Power obtained from the sixth direct-current voltage portion is used as driving power for the digital control unit in the secondary controller.

The isolated switching power supply apparatus is a forward converter. The rectification switching element includes a first synchronous rectifier and a second synchronous rectifier. The second synchronous rectifier is turned off immediately before the main switching element is turned on.

The isolated switching power supply apparatus further includes an active clamping circuit that is connected in parallel to the primary winding of the power transmission transformer or the main switching element and is a series circuit including a resonant capacitor and an auxiliary switching element. The digital control unit in the primary controller controls the auxiliary switching element so that the auxiliary switching element and the main switching element perform complementary operations before and after a dead period.

According to a preferred embodiment of the present invention, the following effects and advantages are obtained. By regenerating charging/discharging energy of a main switch and an input capacitor in a synchronous rectifier every switching period, it is possible to reduce a driving loss even when the die sizes of the main switch and the synchronous rectifier and a switching frequency are increased. A single pulse transformer can transmit both a signal indicating a time at which a primary-side switching element is turned on and a signal indicating a time at which the primary-side switching element is turned off between the primary side and a secondary side. In a power supply apparatus requiring two different drive voltages, by generating one of the drive voltages from the other one of the drive voltages using a switching regulator function that is usually provided for a circuit according to a preferred embodiment of the present invention, it is possible to increase circuit efficiency of the power supply apparatus and simplify a circuit configuration as compared with a case in which a switching regulator is used. A primary-side IC and a secondary-side IC can have the same hardware configuration using software. This leads to the reduction in the manufacturing cost of an IC.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Figure 1:
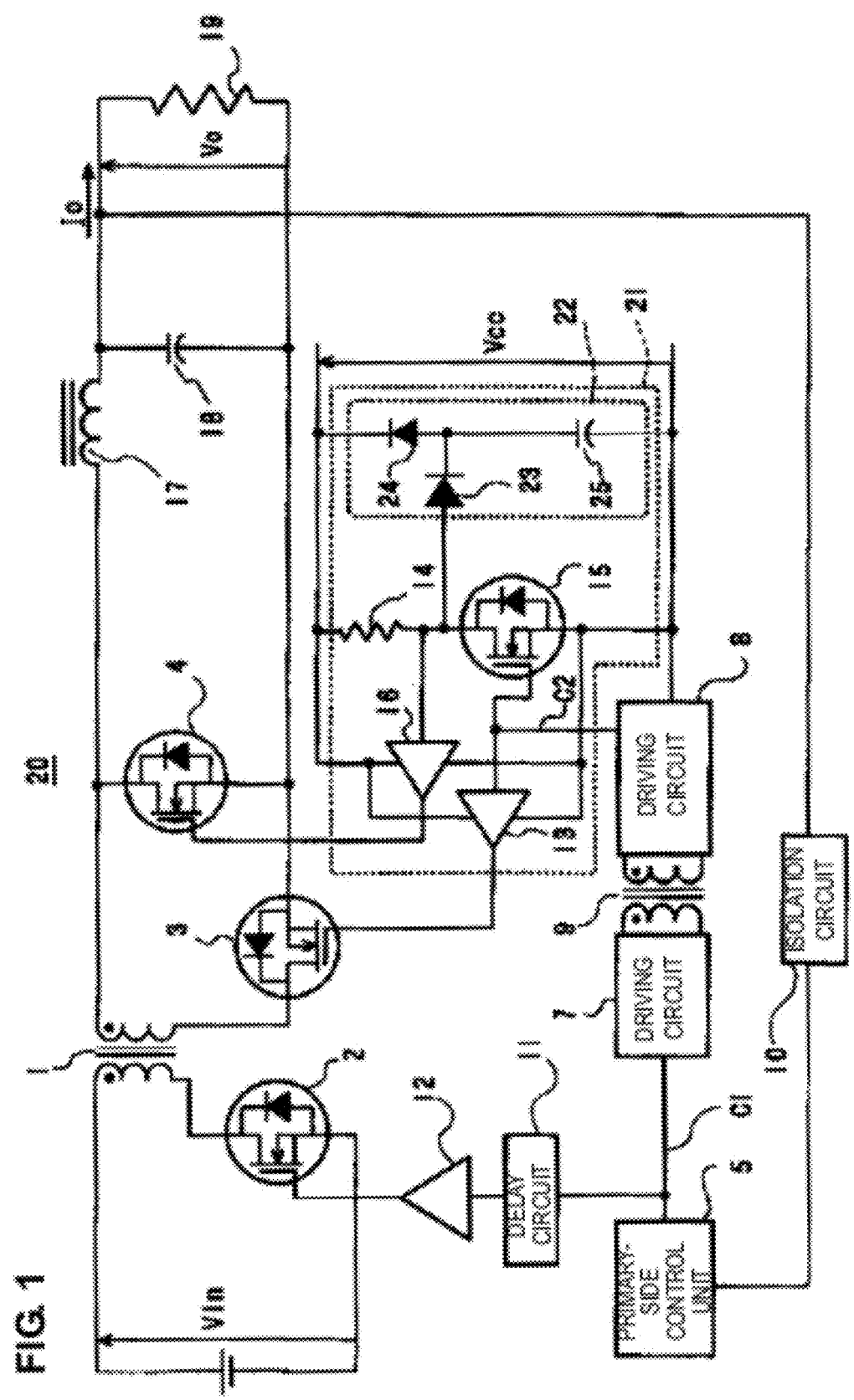
FIG. 1 is a diagram illustrating a basic configuration of an isolated DC-DC converter disclosed in Japanese Unexamined Patent Application Publication No. 2002-272097.
Figure 2:
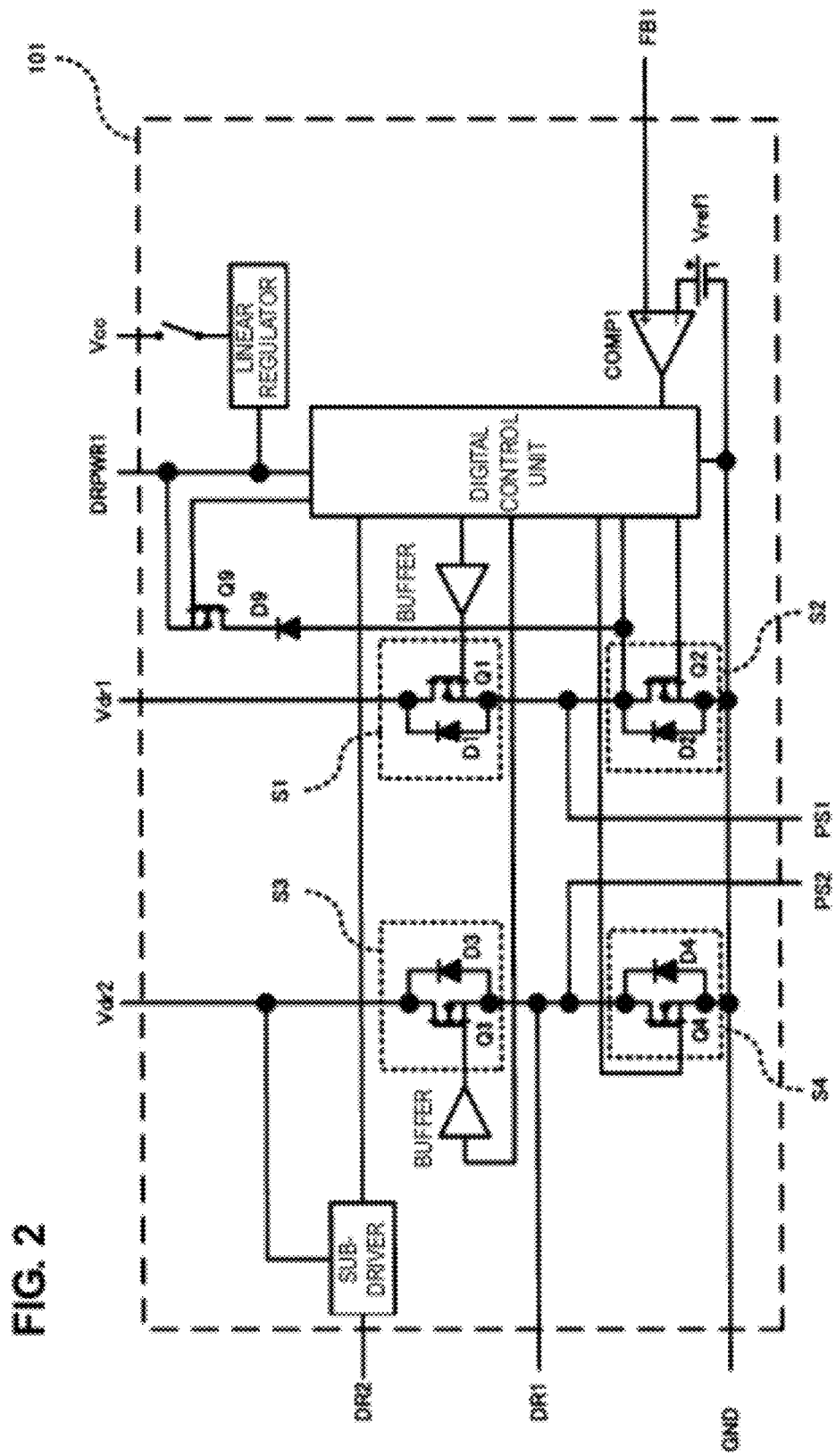
FIG. 2 is an internal block diagram of a control IC according to a first preferred embodiment of the present invention.

FIG. 2 is an internal block diagram of a control IC 101 used in an isolated switching power supply apparatus according to the first preferred embodiment of the present invention. The control IC 101 includes series circuits and a digital control unit. One of the series circuits includes a first switching circuit S1 and a second switching circuit S2. The other one of the series circuits includes a third switching circuit S3 and a fourth switching circuit S4. The first switching circuit S1 includes a first switching element Q1 and a first diode D1 that are connected in parallel. The second switching circuit S2 includes a second switching element Q2 and a second diode D2 that are connected in parallel. The third switching circuit S3 includes a third switching element Q3 and a third diode D3 that are connected in parallel. The fourth switching circuit S4 includes a fourth switching element Q4 and a fourth diode D4 that are connected in parallel. The digital control unit outputs a control signal to control the turning on/off of each of the switching circuits S1 to S4.

A first pulse signal terminal PS1 and a second pulse signal terminal PS2 which are used for connection to an inductance element are disposed at the node between the first switching circuit S1 and the second switching circuit S2 and the node between the third switching circuit S3 and the fourth switching circuit S4, respectively. First ends of the series circuit including the first switching circuit S1 and the second switching circuit S2 and the series circuit including the third switching circuit S3 and the fourth switching circuit S4 are connected to a ground terminal GND, and second ends of the series circuit including the first switching circuit S1 and the second switching circuit S2 and the series circuit including the third switching circuit S3 and the fourth switching circuit S4 are connected to a first direct-current voltage portion Vdr1 and a second direct-current voltage portion Vdr2, respectively. That is, the switching circuits S1 to S4 define a full-bridge circuit, and control signals are individually transmitted from the digital control unit to the first switching circuit S1 and the third switching circuit S3 that are high-side switches via buffers that are high-side drivers.

A winding voltage detection unit Vdet1 configured to detect a potential at the node between the first switching circuit S1 and the second switching circuit S2 is disposed at the node. A first drive signal output terminal DR1 is disposed at the node between the third switching circuit S3 and the fourth switching circuit S4. The first drive signal output terminal DR1 outputs, as a first drive signal, energy supplied from the first direct-current voltage portion Vdr1 via the first pulse signal terminal PS1 and the second pulse signal terminal PS2 when the first switching circuit S1 and the fourth switching circuit S4 are turned on and the second switching circuit S2 and the third switching circuit S3 are turned off in response to a signal output from the digital control unit. The first drive signal is input into the digital control unit.

A sub-driver Subdr and a second drive signal output terminal DR2 are provided. The sub-driver Subdr obtains power from, for example, the second direct-current voltage portion Vdr2 and outputs a second drive signal in response to a signal output from the digital control unit. The second drive signal is output from the second drive signal output terminal DR2.

A first comparator COMP1 and a first reference voltage source Vref1 are provided. The first reference voltage source Vref1 is connected to the first comparator COMP1, and a signal output from the first comparator COMP1 is input into the digital control unit.

A driving power supply terminal Vcc of a control IC and a fifth direct-current voltage portion DRPWR1 of the digital control unit are provided. In general, a driving voltage for a digital control circuit is a low voltage ranging from approximately 0.8 V to approximately 3.3 V, for example, and a driving voltage for a power semiconductor element is a high voltage ranging from approximately 5 V to approximately 15

V, for example. Accordingly, when a single type of power supply voltage is used, a linear regulator steps down a voltage supplied from the driving power supply terminal Vcc of the control IC to a driving voltage for the digital control unit and supplies the voltage to the digital control unit.

The node between the first switching circuit S1 and the second switching circuit S2 is connected to the fifth direct-current voltage portion DRPWR1 of the digital control unit via a ninth diode D9 and a ninth switching circuit S9. The ninth switching circuit S9 is controlled by the digital control unit.

Figure 3:
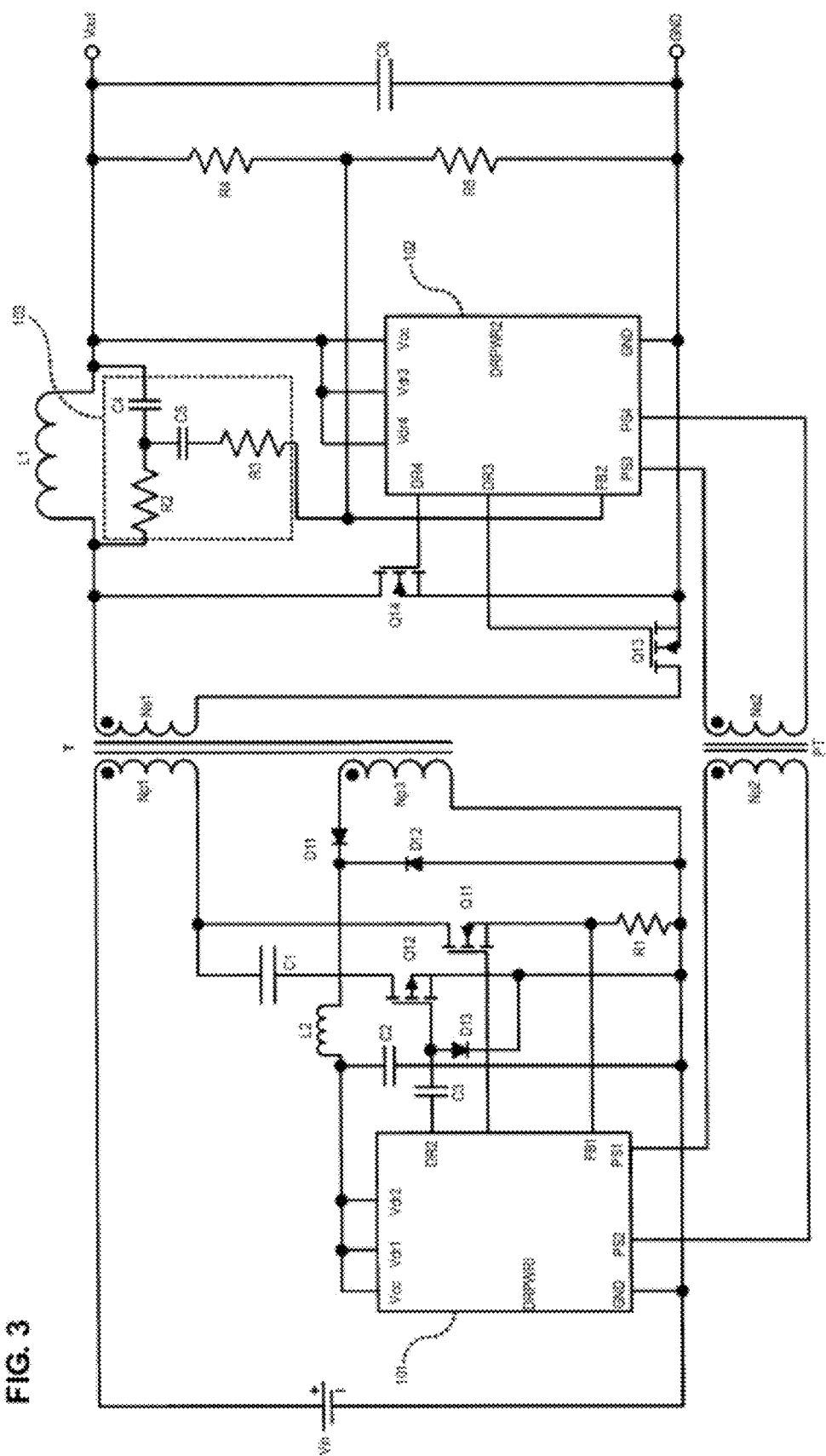
FIG. 3 is a diagram illustrating an exemplary circuit in a switching power supply apparatus using a control IC according to the first preferred embodiment of the present invention.

FIG. 3 is a circuit diagram of an isolated DC-DC converter according to the first preferred embodiment including the control IC illustrated in FIG. 2.

A primary winding Np1 of a power transmission transformer T and a series circuit including an eleventh switching element Q11 and a first resistor R1 are connected to both ends of a direct-current input power supply Vin. A series circuit including a first capacitor C1 and a twelfth switching element Q12 that is a p-channel MOSFET is connected in parallel to the eleventh switching element Q11.

A synchronous rectification circuit including a thirteenth switching element Q13 functioning as a rectification synchronous rectifier and a fourteenth switching element Q14 functioning as a commutation synchronous rectifier is connected to both ends of a secondary winding Ns1 of the power transmission transformer T. A direct-current voltage is output to an output terminal Vout via a smoothing circuit including a first inductor L1 and a fourth capacitor C4.

In order to obtain drive voltages at the driving power supply terminal Vcc, the first direct-current voltage portion Vdr1, and the second direct-current voltage portion Vdr2 and control the eleventh switching element Q11, a control terminal of the eleventh switching element Q11 and the first drive signal output terminal DR1 of the primary-side control IC 101 are connected. In order to control the twelfth switching element Q12, a control terminal of the twelfth switching element Q12 and the second drive signal output terminal DR2 of the primary-side control IC 101 are connected via a level shift circuit including a third capacitor C3 and a thirteenth diode D13. In order to detect a current passing through the eleventh switching element Q11 by using the first resistor R1 as a current detection resistor, the node between the eleventh switching element Q11 and the first resistor R1 is connected to a first feedback signal input terminal FB1 of the primary-side control IC 101. Both ends of a primary winding Np2 of a timing signal transmission transformer PT are connected to the first pulse signal terminal PS1 and the second pulse signal terminal PS2 of the primary-side control IC 101. The ground terminal GND of the primary-side control IC 101 is connected to a GND line.

In order to obtain drive voltages at the driving power supply terminal Vcc, a third direct-current voltage portion Vdr3, and a fourth direct-current voltage portion Vdr4 from an output voltage obtained by rectifying and smoothing a voltage generated at the secondary winding Ns1 of the power transmission transformer T and to control the thirteenth switching element Q13, a control terminal of the thirteenth switching element Q13 and a third drive signal output terminal DR3 of a secondary-side control IC 102 are connected. In order to control the fourteenth switching element Q14, a control terminal of the fourteenth switching element Q14 and a fourth drive signal output terminal DR4 of the secondary-side control IC 102 are connected. A signal obtained by dividing an output voltage with a fourth resistor R4 and a fifth resistor R5 and a ramp wave signal output from a ramp wave generation circuit 103 are combined, and a resultant signal is input into a second feedback signal input terminal FB2 of the secondary-side control IC 102. The ramp wave generation circuit 103 is used to detect a current passing through the first inductor L1 and includes a second resistor R2, a third resistor R3, a fourth capacitor C4, and a fifth capacitor C5. Both ends of a secondary winding Ns2 of the timing signal transmission transformer PT are connected to a third pulse signal terminal PS3 and a fourth pulse signal terminal PS4 of the secondary-side control IC 102. A sixth capacitor C6 functions as a smoothing capacitor.

By using MOSFETs as the first switching circuit S1 to the fourth switching circuit S4 in the primary-side control IC 101 and a fifth switching circuit S5 to an eighth switching circuit S8 in the secondary-side control IC 102, body diodes of the MOSFETs can be used as the first diode D1 to the fourth diode D4 in the primary-side control IC 101 and a fifth diode D5 to an eighth diode D8 in the secondary-side control IC 102. In particular, the eleventh switching element Q11 to the fourteenth switching element Q14 that are power semiconductor elements may not be MOSFETs, and may be bipolar junction transistors (BJTs) or insulated-gate bipolar transistors (IGBTs). Referring to FIG. 3, only the twelfth switching element Q12 is a p-channel FET, and other switching elements are n-channel FETs. The type of an FET used as each switching element may be changed as appropriate.

As will be described in detail later, the primary-side control IC 101 and the secondary-side control IC 102 may preferably have the same hardware configuration.

Figure 4:
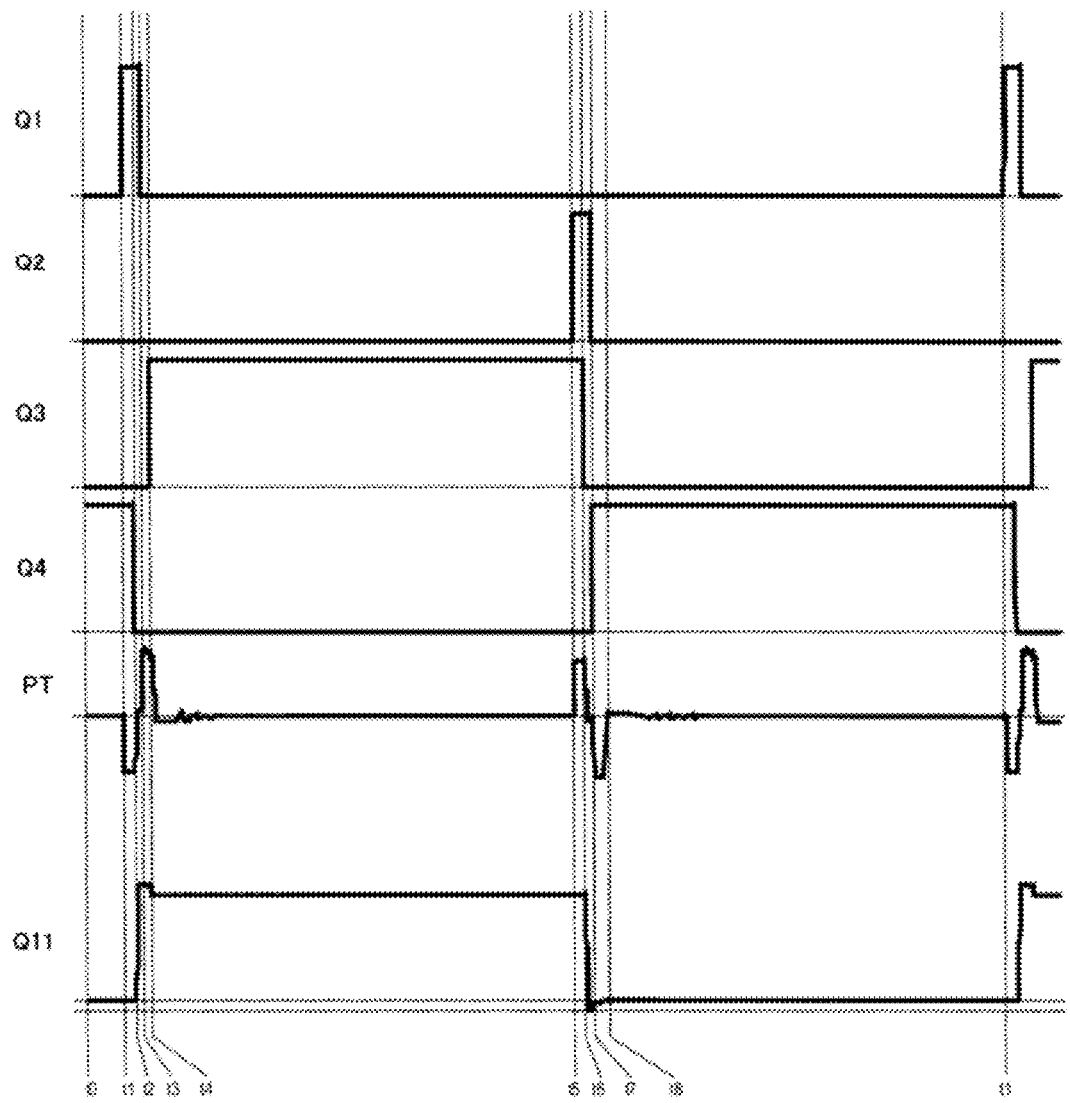
FIG. 4 is a waveform diagram of each unit in a switching period.

FIG. 4 is a waveform diagram illustrating the changes in voltage at the first switching element Q1 to the fourth switching element Q4, the change in gate-to-source voltage at the eleventh switching element Q11, and the change in voltage across the primary winding Np2 of the timing signal transmission transformer PT in a switching period of the eleventh switching element Q11.

The operation of each unit in the switching period of the eleventh switching element Q11 will be described using times t0 to t8.

Operation in Period from Time t0 to Time t1

Figure 5:
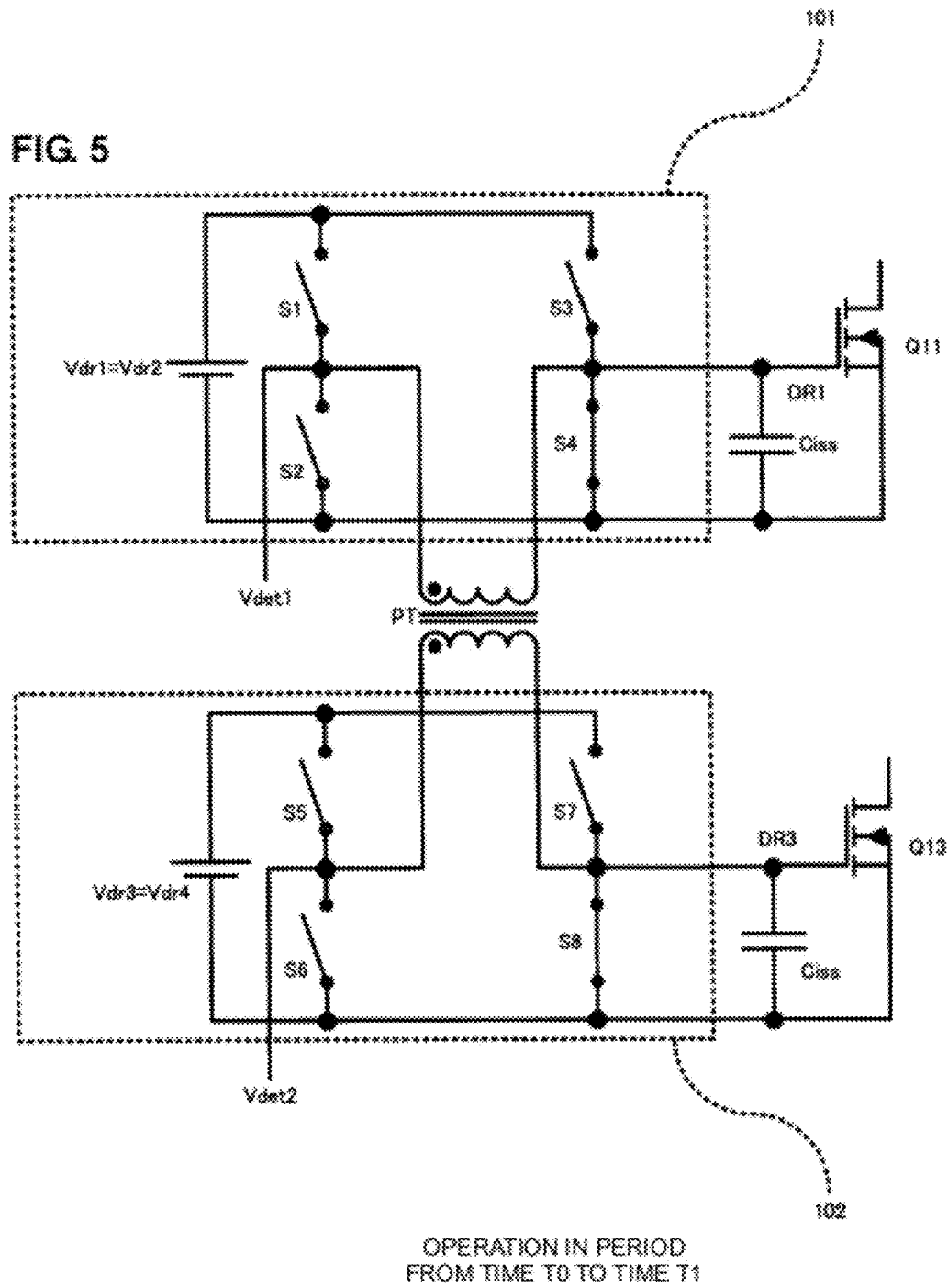
FIG. 5 is a diagram describing the internal operation of a control IC in a period from a time t0 to a time t1.

FIG. 5 is a circuit block diagram describing operations of the primary-side control IC 101 and the secondary-side control IC 102 in this period. For easier understanding of circuit operations, the illustration of the driving power supply terminal Vcc, the fifth direct-current voltage portion DRPWR1, the first feedback signal input terminal FB1, the second drive signal output terminal DR2, the first comparator COMP1, the digital control unit, the ninth diode D9, and the ninth switching circuit S9, which are illustrated in FIG. 2, is omitted. It is assumed that the first direct-current voltage portion Vdr1 and the second direct-current voltage portion Vdr2 are connected to the driving power supply terminal Vcc. The gate terminals of the first switching circuit S1 to the eighth switching circuit S8 are controlled in accordance with a signal output from the digital control unit (not illustrated). The primary-side control IC 101 and the secondary-side control IC 102 preferably have the same hardware configuration.

In this period, the first switching circuit S1, the second switching circuit S2, and the third switching circuit S3 are in an OFF state, and the fourth switching circuit S4 is in an ON state. Since the fourth switching circuit S4 is in the ON state, the gate and the source of the eleventh switching element Q11 connected to the first drive signal output terminal DR1 of the primary-side control IC 101 are shorted and no electric charge is stored in an input capacitor Ciss included in the eleventh switching element Q11. That is, the eleventh switching element Q11 is in the OFF state.

The twelfth switching element Q12 is a switch for a clamping circuit. Since the twelfth switching element Q12 and the eleventh switching element Q11 perform complementary operations before and after a dead period, the twelfth switching element Q12 is in the ON state.

Like in the primary-side control IC 101, in the secondary-side control IC 102, the fifth switching circuit S5, the sixth switching circuit S6, and the seventh switching circuit S7 are in the OFF state and the eighth switching circuit S8 is in the ON state. Since the eighth switching circuit S8 is in the ON state, the gate and the source of the thirteenth switching element Q13 connected to the third drive signal output terminal DR3 of the secondary-side control IC 102 are shorted and no electric charge is stored in the input capacitor Ciss included in the thirteenth switching element Q13. That is, the thirteenth switching element Q13 functioning as a rectifier-side synchronous rectifier is in the OFF state.

Since the fourteenth switching element Q14 functioning as a commutator-side synchronous rectifier and the thirteenth switching element Q13 perform complementary operations before and after a dead period, the fourteenth switching element Q14 is in the ON state.

Operation at Time t1

Figure 6:
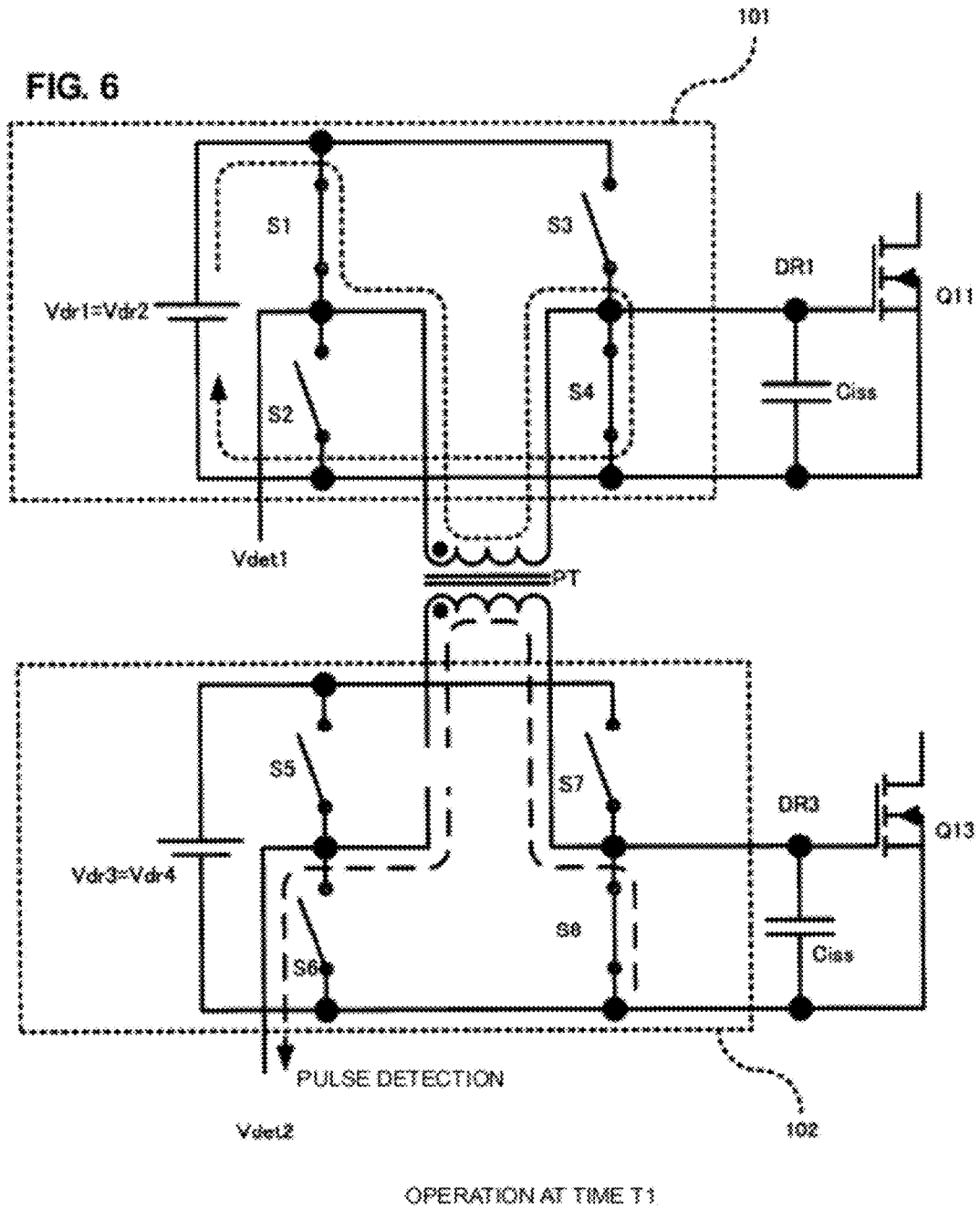
FIG. 6 is a diagram describing the internal operation of the control IC at the time t1.

FIG. 6 is a circuit block diagram describing operations of the primary-side control IC 101 and the secondary-side control IC 102 at the time t1.

At the time t1, the first switching circuit S1 in the primary-side control IC 101 is turned on. As a result, a current supplied from the first direct-current voltage portion Vdr1 flows via the first switching circuit S1, the primary winding Np2 of the timing signal transmission transformer PT, and the fourth switching circuit S4. When the primary winding Np2 of the timing signal transmission transformer PT is energized, a voltage is generated at the secondary winding Ns2 of the timing signal transmission transformer PT. Accordingly, a positive pulse voltage is generated at a secondary winding voltage detection unit Vdet2 that is located at the node between the fifth switching circuit S5 and the sixth switching circuit S6 and is detected by the secondary winding voltage detection unit Vdet2.

Operation in Period From Time t1 to Time t2

Figure 7:
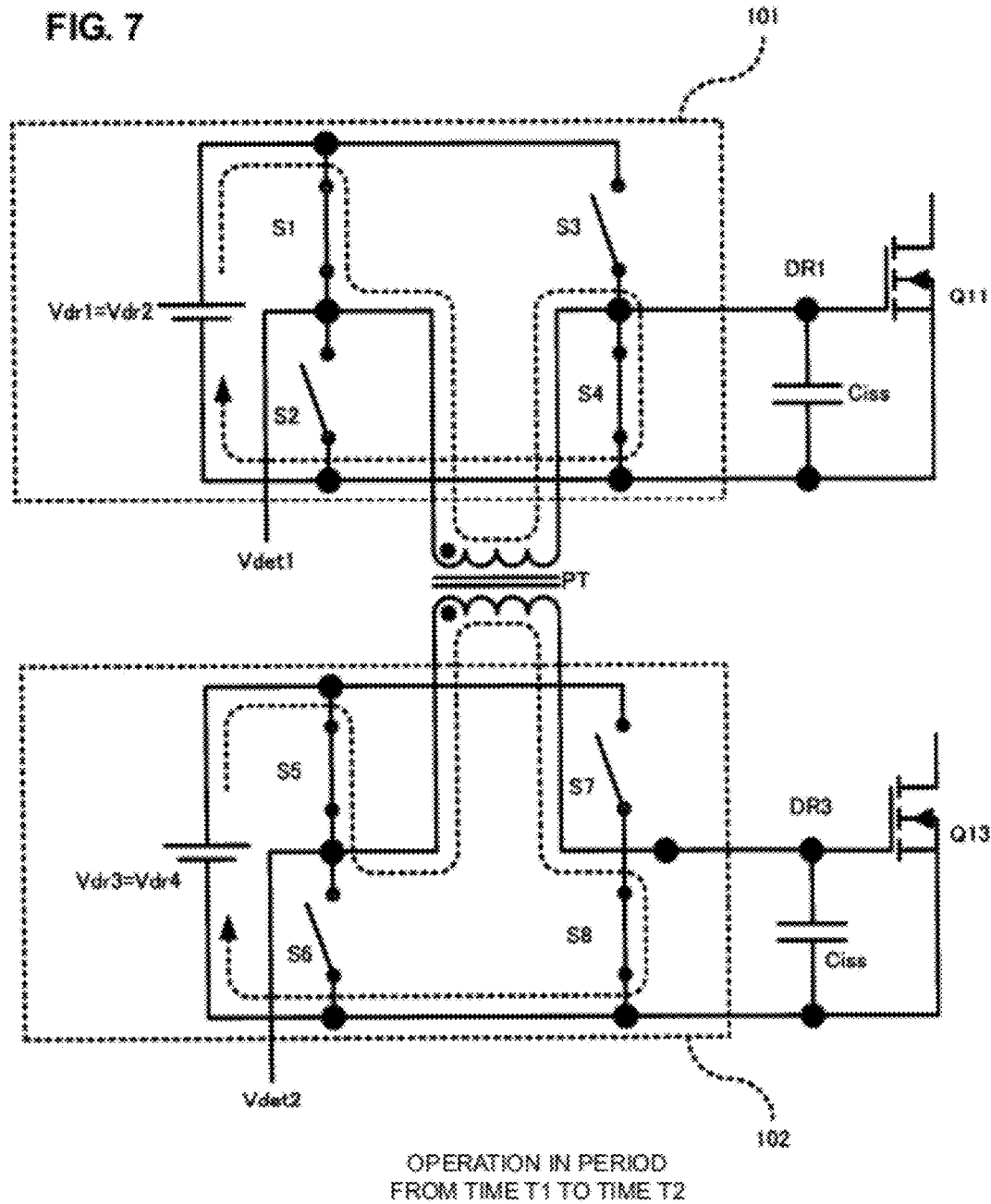
FIG. 7 is a diagram describing the internal operation of the control IC in a period from the time t1 to a time t2.

FIG. 7 is a circuit block diagram describing operations of the primary-side control IC 101 and the secondary-side control IC 102 in the period from the time t1 to the time t2.

When a voltage is input into the secondary winding voltage detection unit Vdet2, the digital control unit in the secondary-side control IC 102 turns on the fifth switching circuit S5. As a result, a current supplied from the fourth direct-current voltage portion Vdr4 of the secondary-side control IC 102 flows via the fifth switching circuit S5, the secondary winding Ns2 of the timing signal transmission transformer PT, and the eighth switching circuit S8.

Operation at Time t2

Figure 8:
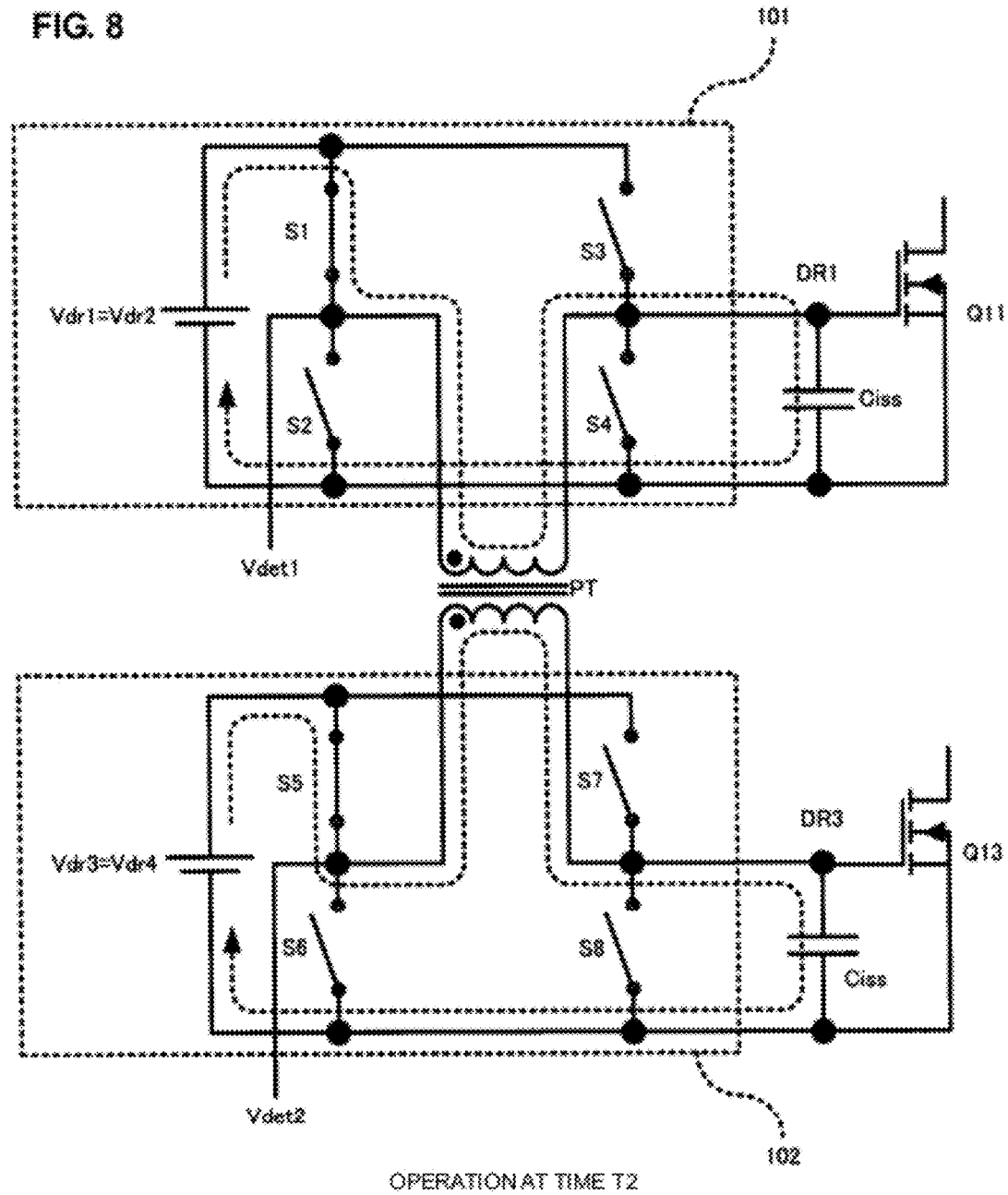
FIG. 8 is a diagram describing the internal operation of the control IC at the time t2.

FIG. 8 is a circuit block diagram describing operations of the primary-side control IC 101 and the secondary-side control IC 102 at the time t2.

At the time t2, the digital control unit in the primary-side control IC 101 and the digital control unit in the secondary-side control IC 102 turn off the fourth switching circuit S4 and the eighth switching circuit S8, respectively. As a result, a current supplied from the first direct-current voltage portion Vdr1 of the primary-side control IC 101 passes through the input capacitor Ciss in the eleventh switching element Q11, an electric charge is stored in the input capacitor Ciss, and the eleventh switching element Q11 is turned on. At the same time, a current supplied from the fourth direct-current voltage portion Vdr4 of the secondary-side control IC 102 passes through the input capacitor Ciss in the thirteenth switching element Q13, an electric charge is stored in the input capacitor Ciss, and the thirteenth switching element Q13 is turned on.

Operation in Period from Time t2 to Time t3

Figure 9:
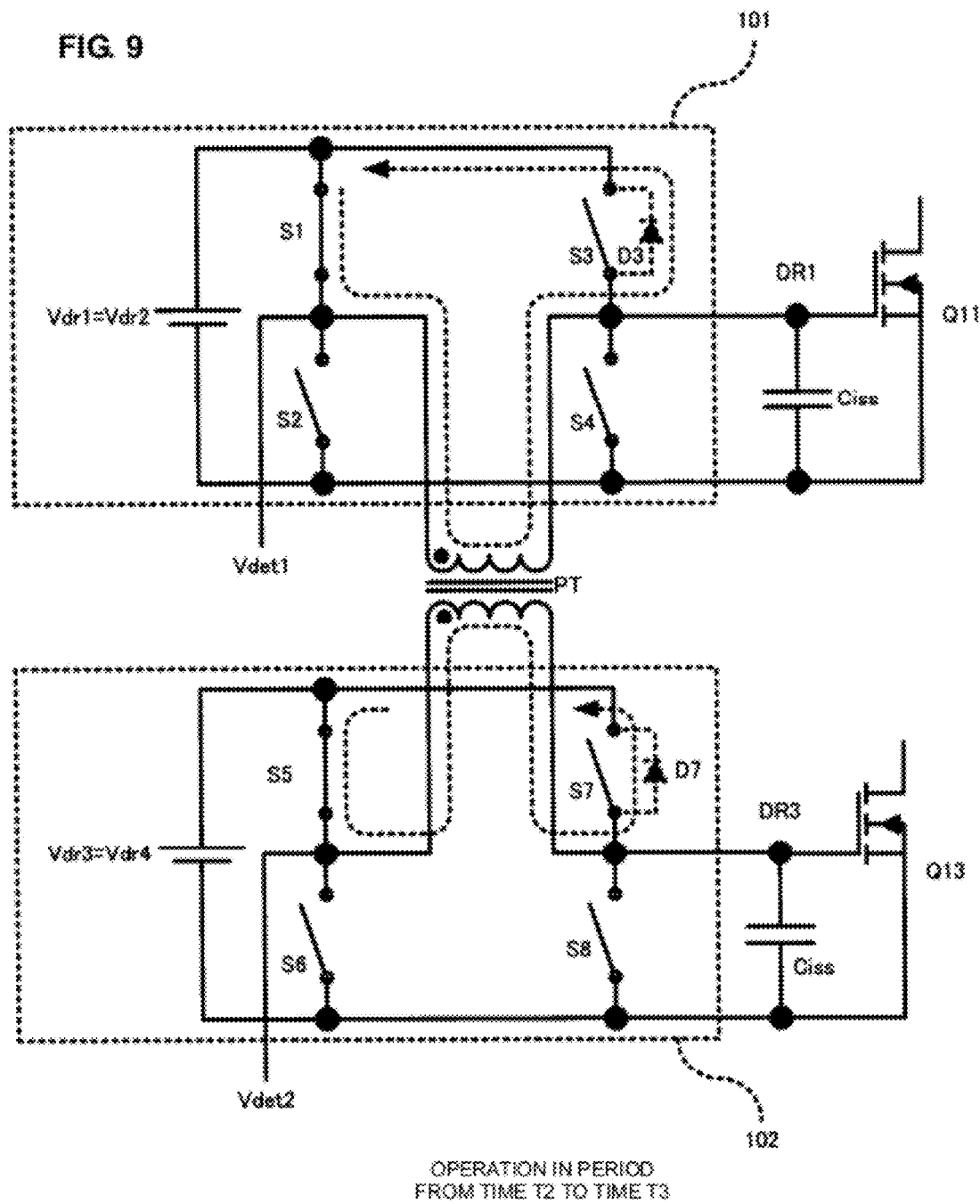
FIG. 9 is a diagram describing the internal operation of the control IC in a period from the time t2 to a time t3.

FIG. 9 is a circuit block diagram describing operations of the primary-side control IC 101 and the secondary-side control IC 102 in the period from the time t2 to the time t3.

In the period from the time t2 to the time t3, when the ON periods of the eleventh switching element Q11 and the thirteenth switching element Q13 end, the current that has been supplied from the first direct-current voltage portion Vdr1 of the primary-side control IC 101 reflows to the first direct-current voltage portion Vdr1 via the first switching element Q1, the primary winding Np2 of the timing signal transmission transformer PT, and the third diode D3 and the current that has been supplied from the fourth direct-current voltage portion Vdr4 of the secondary-side control IC 102 reflows to the fourth direct-current voltage portion Vdr4 via the fifth switching circuit S5, the secondary winding Ns2 of the timing signal transmission transformer PT, and a seventh diode D7.

Operation in Period from Time t3 to Time t4

Figure 10:
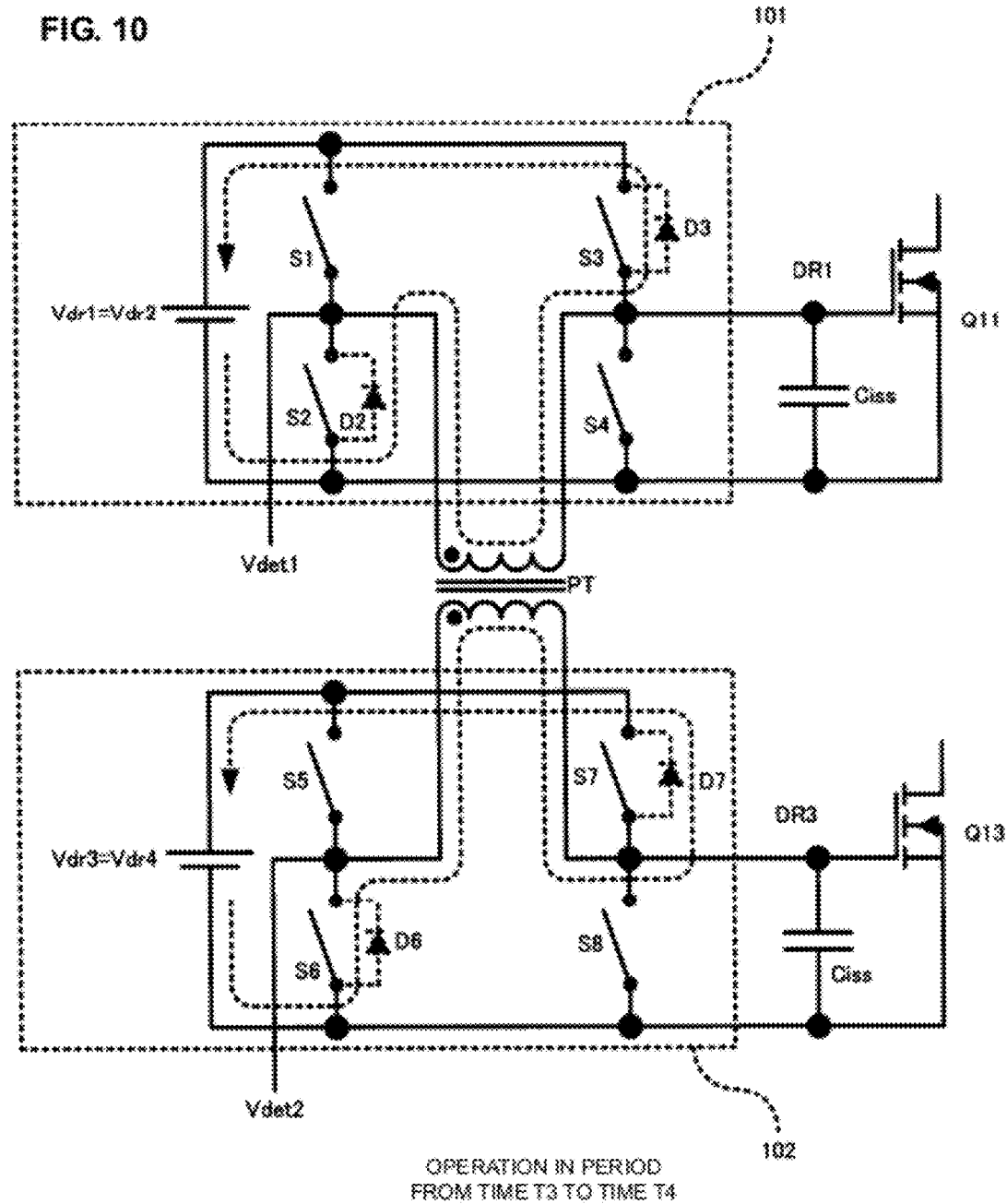
FIG. 10 is a diagram describing the internal operation of the control IC in a period from the time t3 to a time t4.

FIG. 10 is a circuit block diagram describing operations of the primary-side control IC 101 and the secondary-side control IC 102 in the period from the time t3 to the time t4.

At the time t3, the first switching circuit S1 in the primary-side control IC 101 and the fifth switching circuit S5 in the secondary-side control IC 102 are turned off. As a result, in the period from the time t3 to the time t4, a current flows via the second diode D2, the primary winding Np2 of the timing signal transmission transformer PT, and the third diode D3 while decreasing at the primary winding Np2 in the primary-side control IC 101, and a current flows via a sixth diode D6, the secondary winding Ns2 of the timing signal transmission transformer PT, and the seventh diode D7 while decreasing at the secondary winding Ns2 in the secondary-side control IC 102. Electromagnetic energy stored in the timing signal transmission transformer PT is regenerated to the third direct-current voltage portion Vdr3 and the fourth direct-current voltage portion Vdr4.

Operation in Period from Time t4 to Time t5

Figure 11:
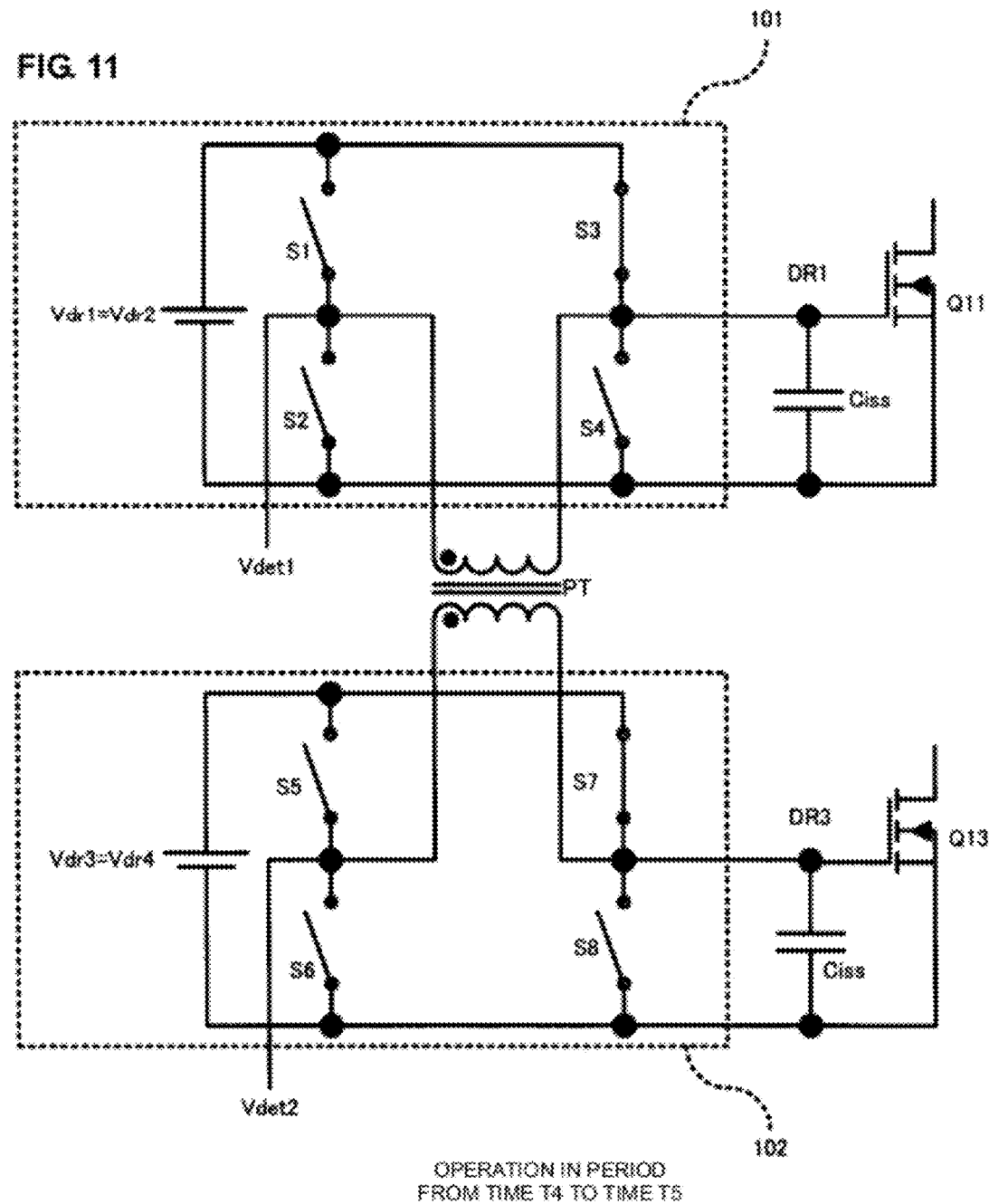
FIG. 11 is a diagram describing the internal operation of the control IC in a period from the time t4 to a time t5.

FIG. 11 is a circuit block diagram describing operations of the primary-side control IC 101 and the secondary-side control IC 102 in the period from the time t4 to the time t5.

At the time t4, the current passing through the primary winding Np2 and the secondary winding Ns2 of the timing signal transmission transformer PT becomes close to zero, no forward current passes through the second diode D2 and the third diode D3 in the primary-side control IC 101, and no forward current passes through the sixth diode D6 and the seventh diode D7 in the secondary-side control IC 102. Subsequently, the third switching circuit S3 in the primary-side control IC 101 and the seventh switching circuit S7 in the secondary-side control IC 102 are turned on. As a result, the gate potentials of the eleventh switching element Q11 and the thirteenth switching element Q13 are maintained at values of voltages supplied from the driving power supply terminals Vcc. That is, the eleventh switching element Q11 and the thirteenth switching element Q13 are kept in the ON state.

Operation at Time t5

Figure 12:
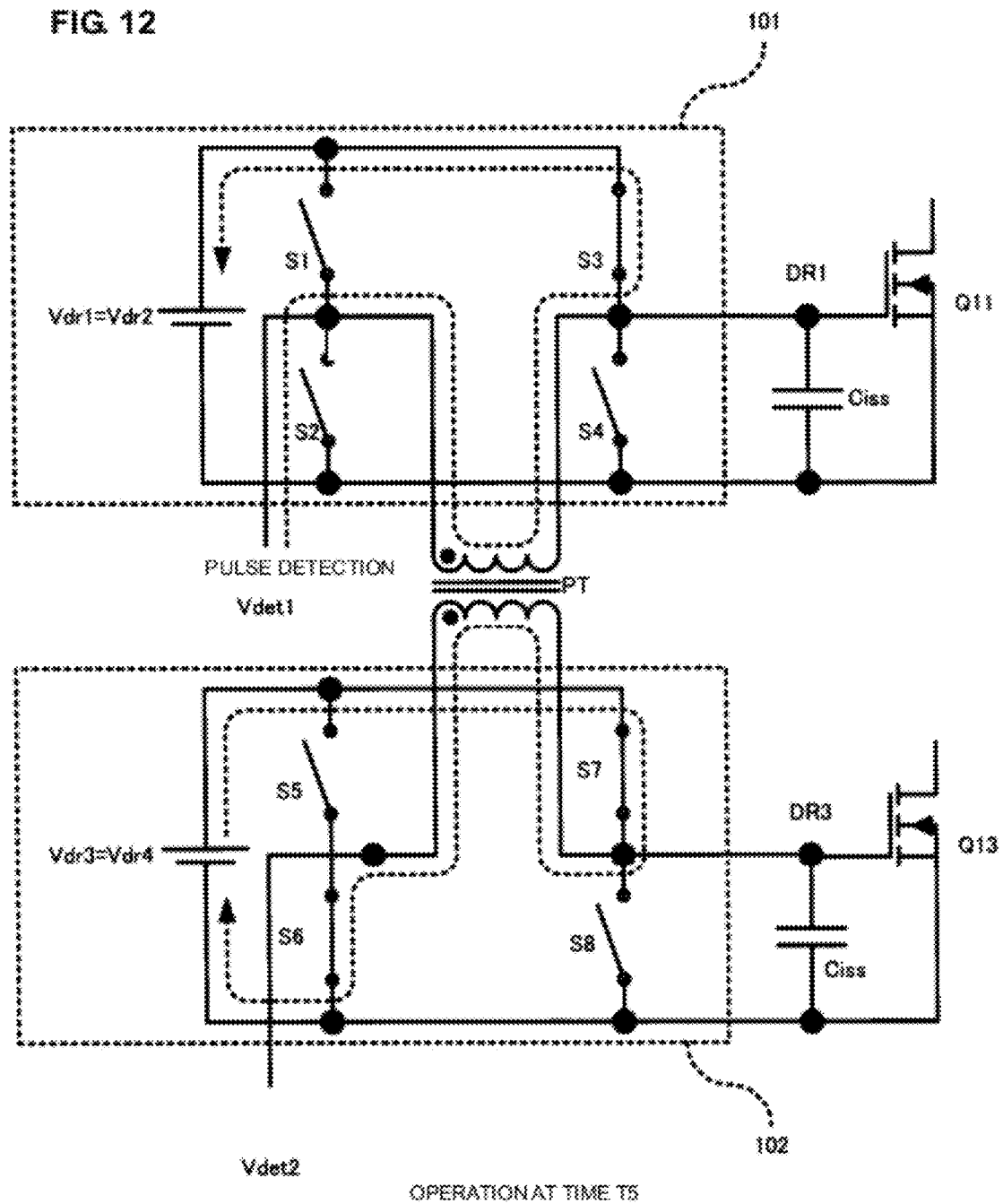
FIG. 12 is a diagram describing the internal operation of the control IC at the time t5.

FIG. 12 is a circuit block diagram describing operations of the primary-side control IC 101 and the secondary-side control IC 102 at the time t5.

At the time t5, the sixth switching circuit S6 in the secondary-side control IC 102 is turned on. As a result, a current supplied from the third direct-current voltage portion Vdr3 flows via the seventh switching circuit S7, the secondary winding Ns2 of the timing signal transmission transformer PT, and the sixth switching circuit S6. When the secondary winding Ns2 of the timing signal transmission transformer PT is energized, a voltage is generated at the primary winding Np2 of the timing signal transmission transformer PT. Accordingly, in the primary-side control IC 101, a negative pulse voltage is generated at the winding voltage detection unit Vdet1 that is located at the node between the first switching circuit S1 and the second switching circuit S2 and is detected by the winding voltage detection unit Vdet1.

Operation in Period from Time t5 to Time t6

Figure 13:
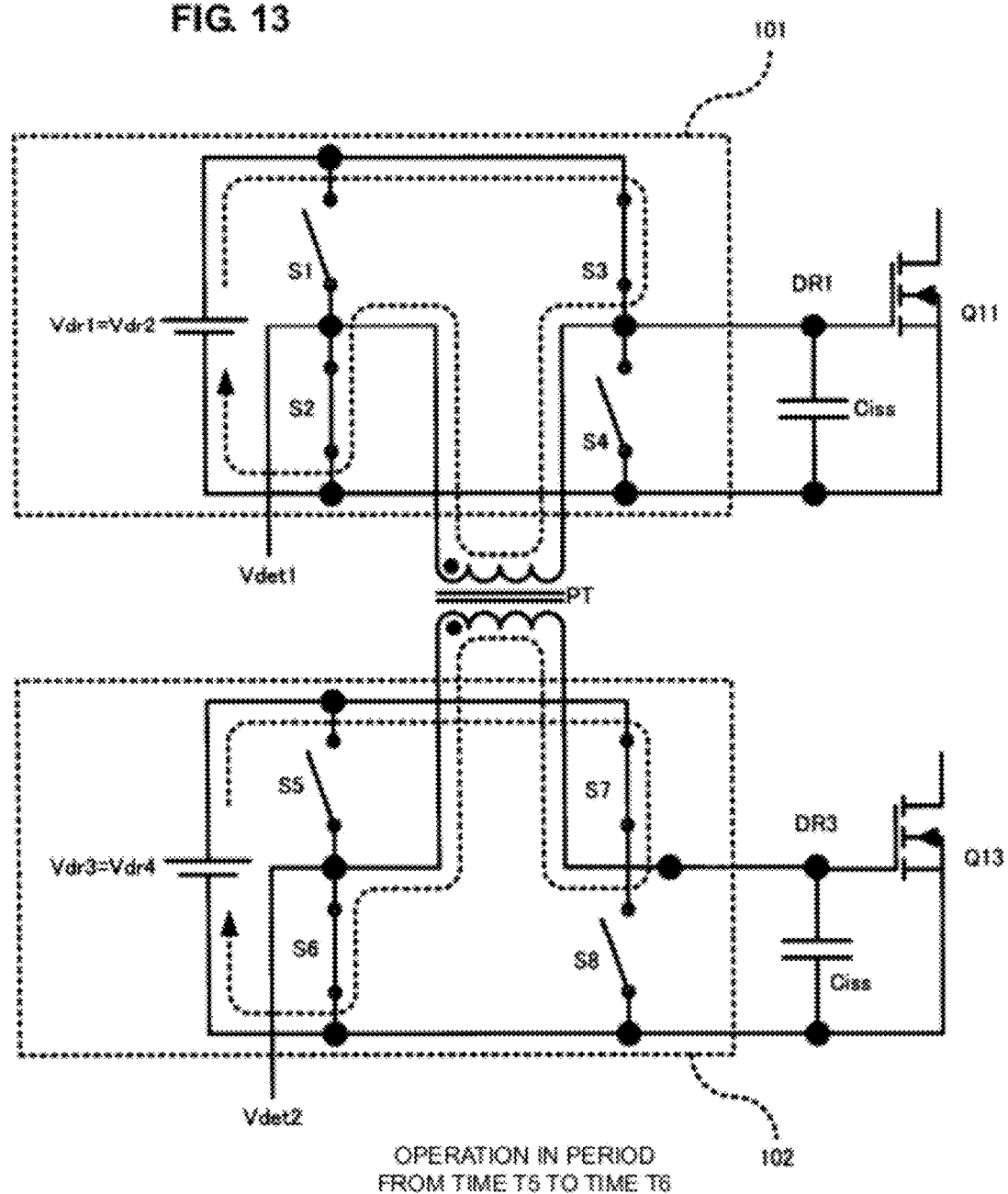
FIG. 13 is a diagram describing the internal operation of the control IC in a period from the time t5 to a time t6.

FIG. 13 is a circuit block diagram describing operations of the primary-side control IC 101 and the secondary-side control IC 102 in the period from the time t5 to the time t6.

When a voltage is input into the winding voltage detection unit Vdet1, the digital control unit in the primary-side control IC 101 turns on the second switching circuit S2. As a result, a current supplied from the second direct-current voltage portion Vdr2 of the primary-side control IC 101 flows via the third switching circuit S3, the primary winding Np2 of the timing signal transmission transformer PT, and the second switching circuit S2.

Operation at Time t6

Figure 14:
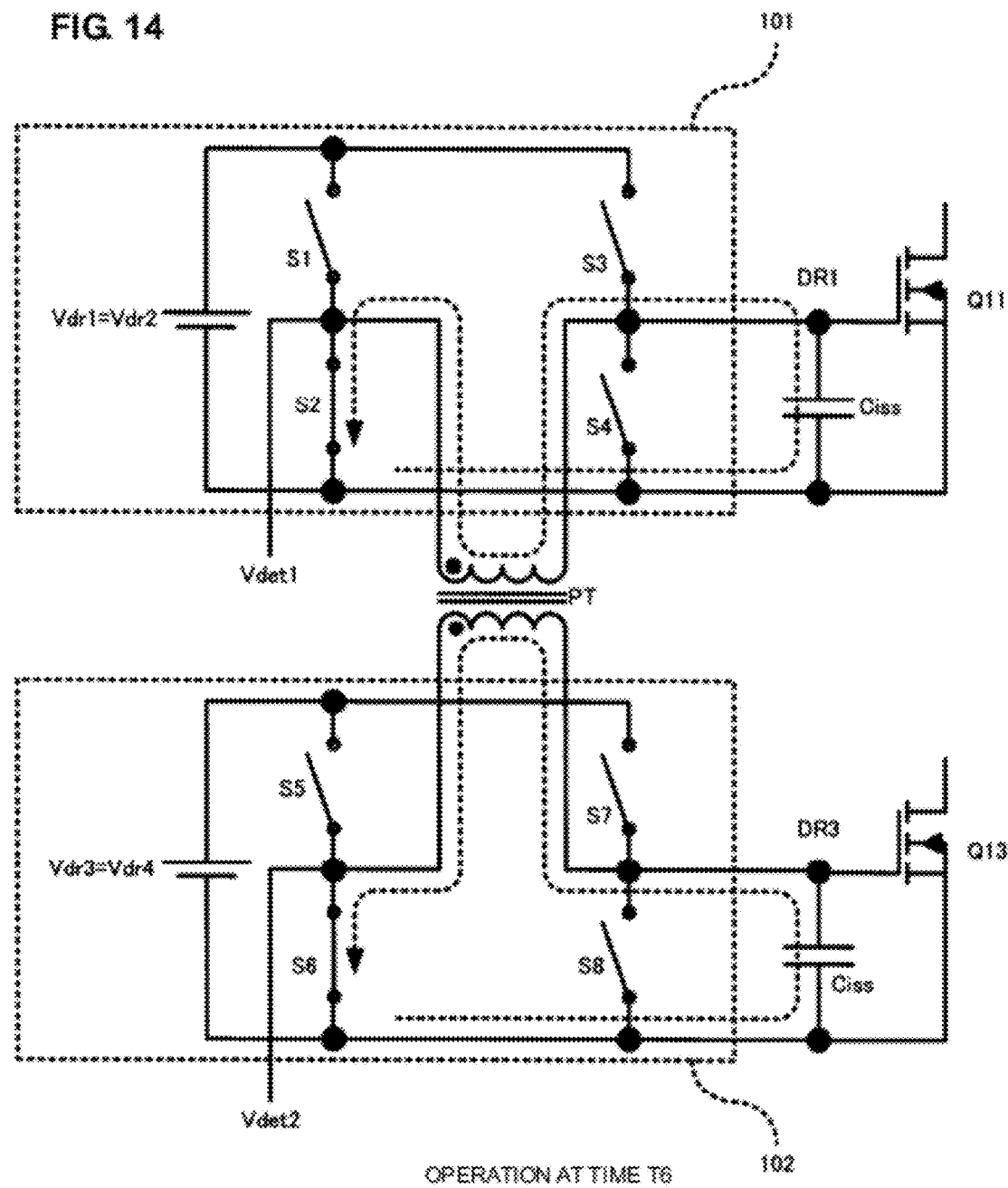
FIG. 14 is a diagram describing the internal operation of the control IC at the time t6.

FIG. 14 is a circuit block diagram describing operations of the primary-side control IC 101 and the secondary-side control IC 102 at the time t6. At the time t6, the digital control unit in the primary-side control IC 101 and the digital control unit in the secondary-side control IC 102 turn off the third switching circuit S3 and the seventh switching circuit S7, respectively. As a result, an electric charge stored in the input capacitor Ciss in the eleventh switching element Q11 is discharged, and the eleventh switching element Q11 is turned off. At the same time, an electric charge stored in the input capacitor Ciss in the thirteenth switching element Q13 is discharged, and the thirteenth switching element Q13 is turned off.

Operation in Period from Time t6 to Time t7

Figure 15:
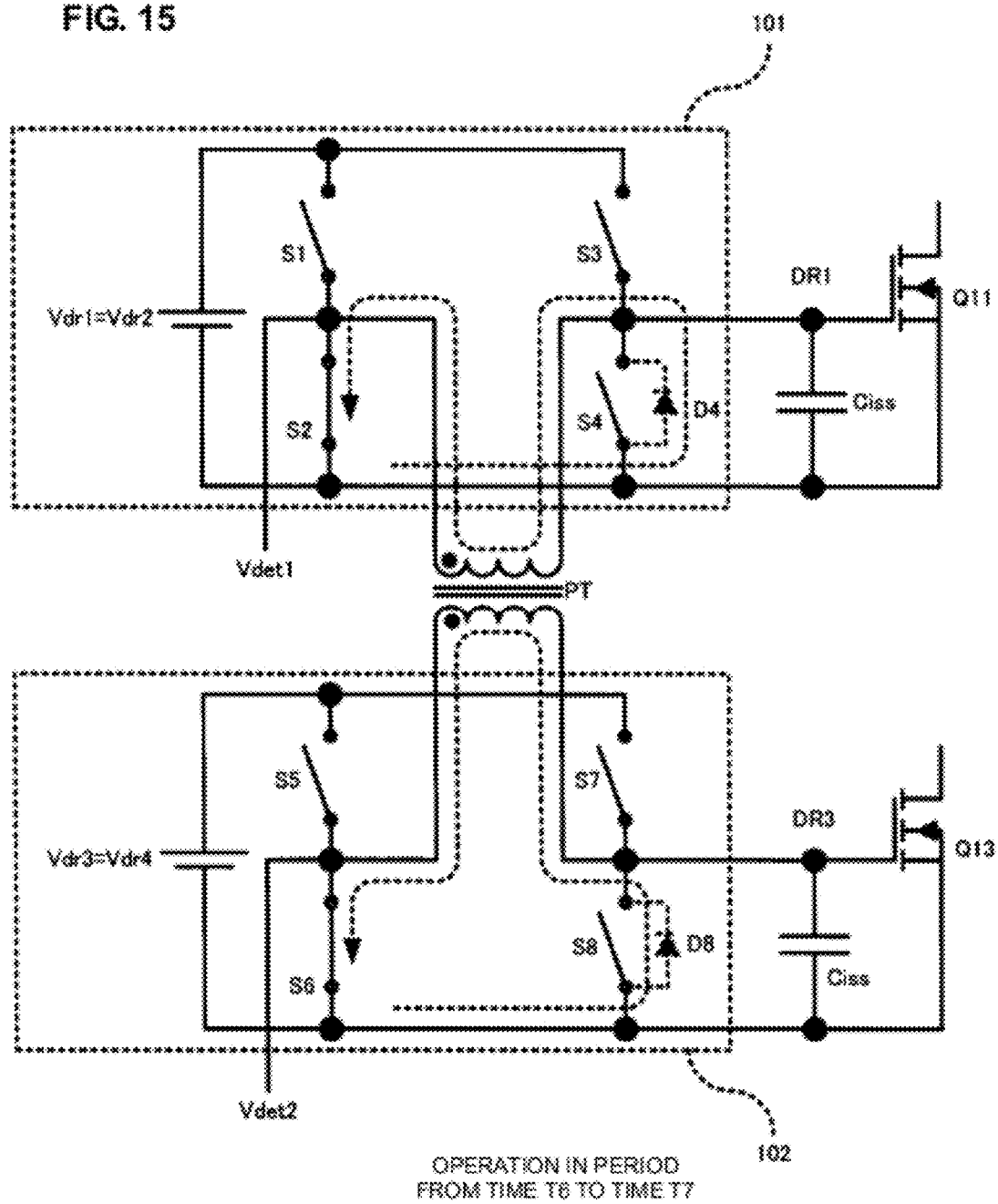
FIG. 15 is a diagram describing the internal operation of the control IC in a period from the time t6 to a time t7.

FIG. 15 is a circuit block diagram describing operations of the primary-side control IC 101 and the secondary-side control IC 102 in the period from the time t6 to the time t7.

In the period from the time t6 to the time t7, when the gate-to-source voltages of the eleventh switching element Q11 and the thirteenth switching element Q13 reach approximately 0 V, a current reflows to the ground terminal GND of the primary-side control IC 101 via the fourth diode D4, the primary winding Np2 of the timing signal transmission transformer PT, and the second switching circuit S2 and a current reflows to the ground terminal GND of the secondary-side control IC 102 via the eighth diode D8, the secondary winding Ns2 of the timing signal transmission transformer PT, and the sixth switching circuit S6.

Operation in Period from Time t7 to Time t8

Figure 16:
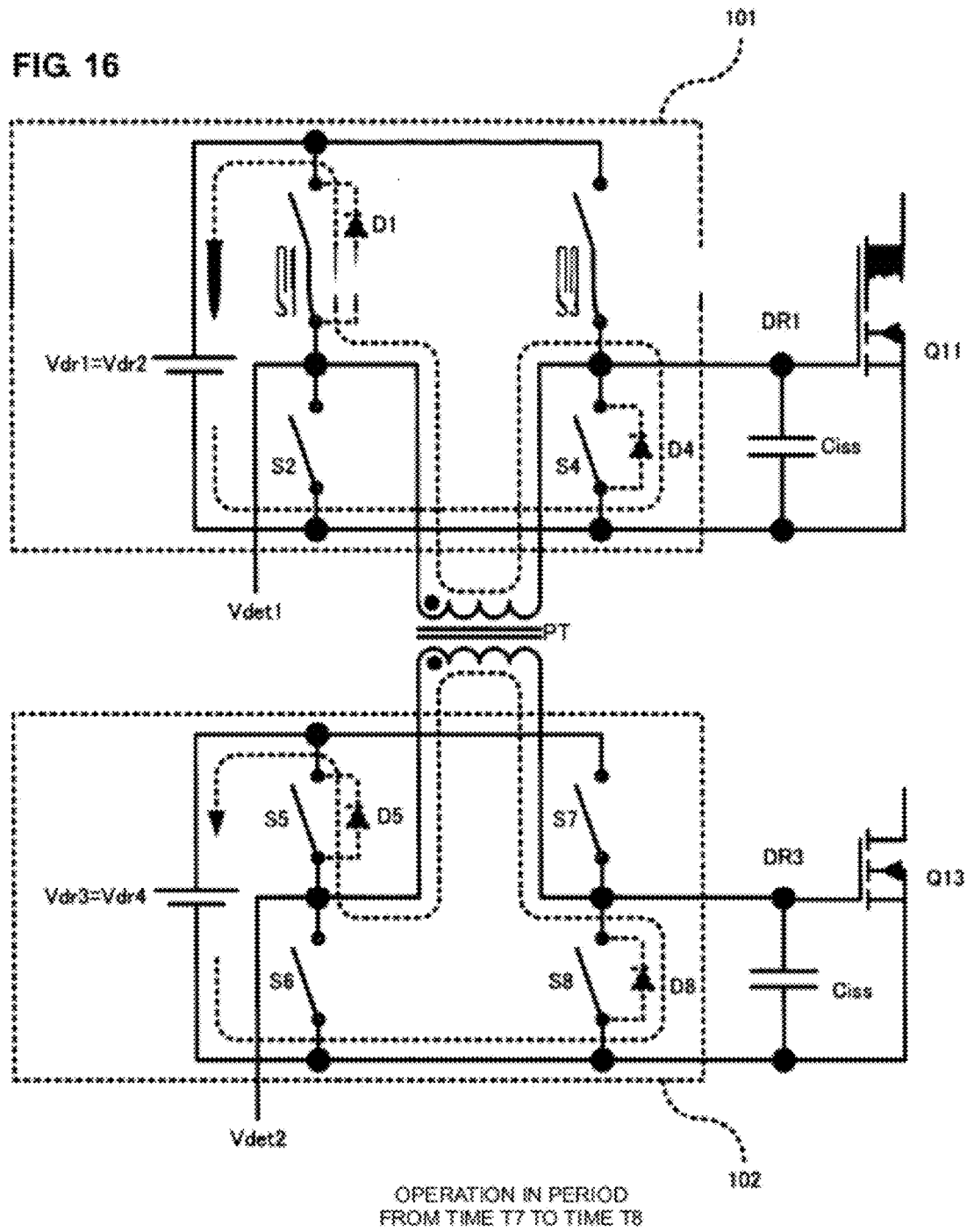
FIG. 16 is a diagram describing the internal operation of the control IC in a period from the time t7 to a time t8.

FIG. 16 is a circuit block diagram describing operations of the primary-side control IC 101 and the secondary-side control IC 102 in the period from the time t7 to the time t8. At the time t7, the fourth switching circuit S4 in the primary-side control IC 101 and the eighth switching circuit S8 in the secondary-side control IC 102 are turned on and the second switching circuit S2 in the primary-side control IC 101 and the sixth switching circuit S6 in the secondary-side control IC 102 are turned off. As a result, in the period from the time t7 to the time t8, a current flows via the fourth diode D4, the primary winding Np2 of the timing signal transmission transformer PT, and the first diode D1 while decreasing at the primary winding Np2 in the primary-side control IC 101, and a current flows via the eighth diode D8, the secondary winding Ns2 of the timing signal transmission transformer PT, and a fifth diode D5 while decreasing at the secondary winding Ns2 in the secondary-side control IC 102. Electromagnetic energy stored in the timing signal transmission transformer PT is regenerated.

Operation after Time t8

An operation in a period from the time t8 to the time t1 is substantially the same as that in the period from the time t0 to the time t1.

In the above-described operations, a signal indicating a time immediately before the eleventh switching element Q11, which is a primary-side main switch, is turned on is transmitted from the primary-side control IC to the secondary side via the timing signal transmission transformer PT, and is used as a timing signal for turning on the thirteenth switching element Q13 that is a rectifier-side synchronous rectifier in the secondary-side synchronous rectification circuit. The signal is output from the secondary-side control IC and is used to turn off the commutator-side synchronous rectifier in the secondary-side synchronous rectification circuit. Since the commutator-side synchronous rectifier is turned off immediately before the main switch is turned on, the generation of a flow-through current which is caused by the simultaneous activation of the main switch and the commutator-side synchronous rectifier is prevented. A signal indicating a time immediately before the thirteenth switching element Q13, which is a rectifier-side synchronous rectifier, is turned off can be transmitted to the primary side via the timing signal transmission transformer PT and be used as a timing signal for turning off the eleventh switching element Q11 that is a primary-side main switch. In contrast to the above-described case, a signal indicating a time immediately before a main switch is turned on may be transmitted from the secondary side to the primary side, or a signal indicating a time immediately before a main switch is turned off may be transmitted from the primary side to the secondary side. A signal that has been transmitted earlier from the primary side or the secondary side is preferentially processed. That is, bidirectional communication can be perfectly achieved with a single timing signal transmission transformer PT.

In the period from the time t0 to the time t2 and the period from the time t4 to the time t6, operations are performed so as to set a dead period in which both the eleventh switching element Q11 and the twelfth switching element Q12 are in the OFF state and a dead period in which both the thirteenth switching element Q13 and the fourteenth switching element Q14 are in the OFF state. If a unit for setting a dead period is disposed, the third switching circuit S3, the fourth switching circuit S4, the seventh switching circuit S7, and the eighth switching circuit S8 may always be in the OFF state, that is, they may be simple diodes.

According to the first preferred embodiment, the above-described effects and advantages are achieved.

Second Preferred Embodiment

Figure 17:
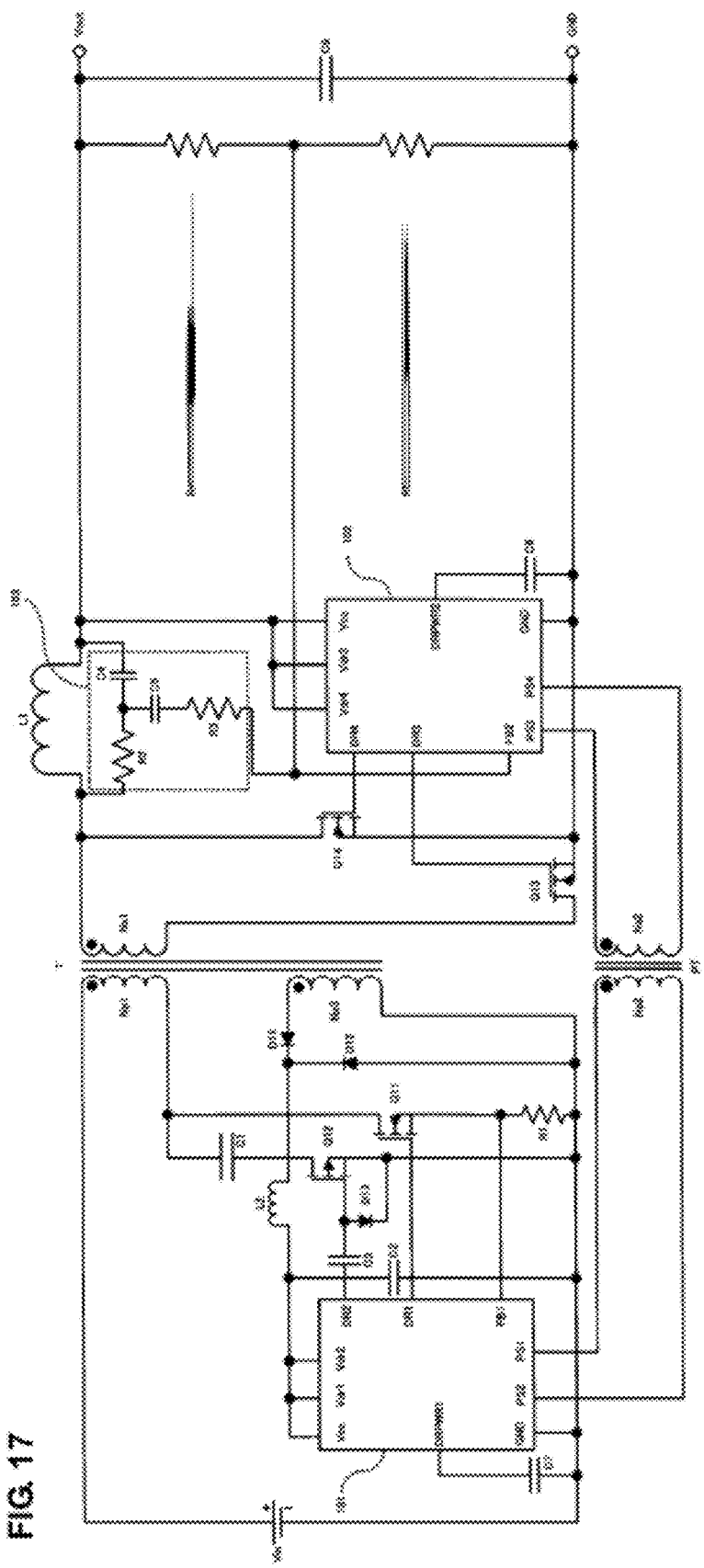
FIG. 17 is a diagram illustrating an exemplary circuit in a switching power supply apparatus using a control IC according to a second preferred embodiment of the present invention.

FIG. 17 is a circuit diagram of an isolated DC-DC converter according to the second preferred embodiment of the present invention including the control IC illustrated in FIG. 2.

The difference between the isolated DC-DC converter according to the first preferred embodiment illustrated in FIG. 3 and the isolated DC-DC converter according to the second preferred embodiment illustrated in FIG. 17 is that a seventh capacitor C7 is connected to the fifth direct-current voltage portion DRPWR1 of the primary-side control IC 101 and an eighth capacitor C8 is connected to a sixth direct-current voltage portion DRPWR2 of the secondary-side control IC 102.

Figure 18:
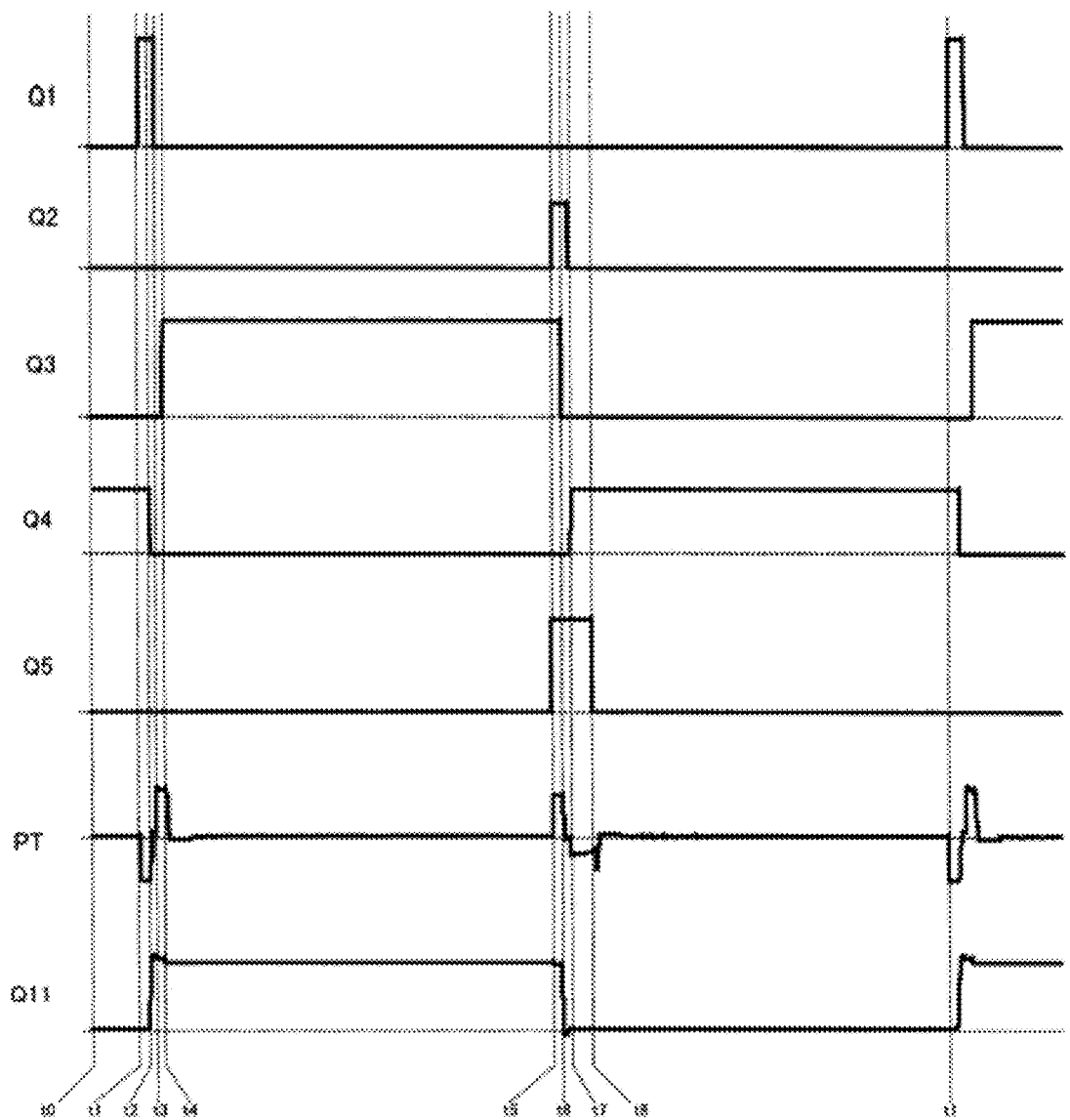
FIG. 18 is a waveform diagram of each unit in a switching period.

FIG. 18 is a waveform diagram illustrating the changes in voltage at the first switching element Q1 to a fifth switching element Q5, the change in gate-to-source voltage at the eleventh switching element Q11, and the change in voltage across the primary winding Np2 of the timing signal transmission transformer PT in a switching period of the eleventh switching element Q11.

The operation of each unit in the switching period of the eleventh switching element Q11 will be described using times t0 to t8.

Operation in Period from Time t0 to Time t1

Figure 19:
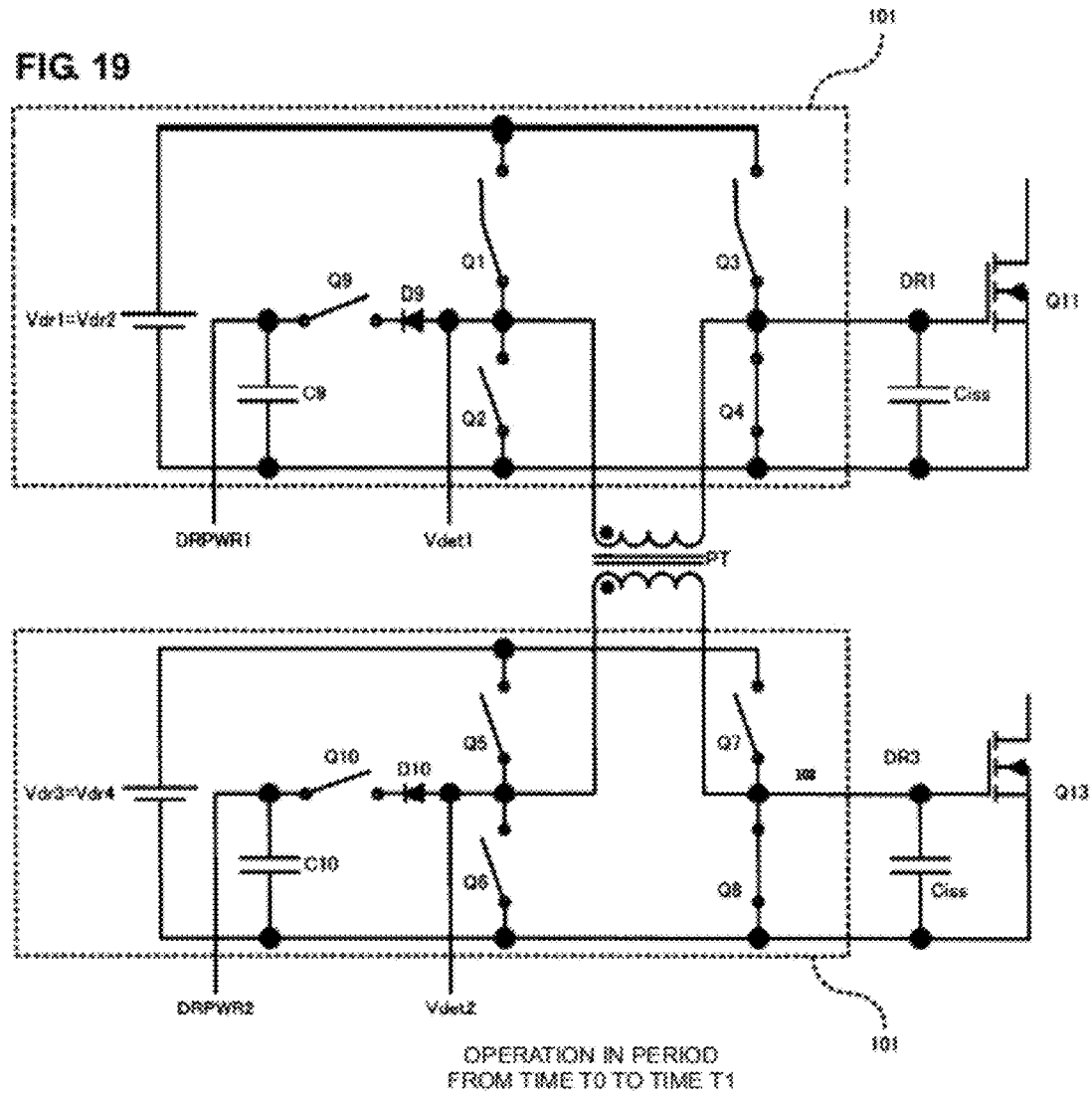
FIG. 19 is a diagram describing the internal operation of a control IC in a period from a time t0 to a time t1.

FIG. 19 is a circuit block diagram describing operations of the primary-side control IC 101 and the secondary-side control IC 102 in this period. As illustrated in FIG. 19, the fifth direct-current voltage portion DRPWR1 for supplying driving power to the digital control unit in the primary-side control IC 101 is connected to the node between the first switching circuit S1 and the second switching circuit S2 via the ninth switching circuit S9 and the ninth diode D9, and the sixth direct-current voltage portion DRPWR2 for supplying driving power to the digital control unit in the secondary-side control IC 102 is connected to the node between the fifth switching circuit S5 and the sixth switching circuit S6 via a tenth switching circuit S10 and a tenth diode D10.

In this period, the first switching circuit S1, the second switching circuit S2, and the third switching circuit S3 are in the OFF state, and the fourth switching circuit S4 is in the ON state. Since the fourth switching circuit S4 is in the ON state, the gate and the source of the eleventh switching element Q11 connected to the first drive signal output terminal DR1 of the primary-side control IC 101 are shorted and no electric charge is stored in the input capacitor Ciss in the eleventh switching element Q11. That is, the eleventh switching element Q11 is in the OFF state.

As is apparent from FIG. 18, since the source-to-gate voltage of the twelfth switching element Q12 that is a p-channel FET is a negative potential, the twelfth switching element Q12 is in the ON state.

In the secondary-side control IC 102, the fifth switching circuit S5, the sixth switching circuit S6, and the seventh switching circuit S7 are in the OFF state, and the eighth switching circuit S8 is in the ON state. Since the eighth switching circuit S8 is in the ON state, the gate and the source of the thirteenth switching element Q13 connected to the third drive signal output terminal DR3 of the secondary-side control IC 102 are shorted and no electric charge is stored in the input capacitor Ciss in the thirteenth switching element Q13. That is, the thirteenth switching element Q13 functioning as a rectifier-side synchronous rectifier is in the OFF state.

Since the fourteenth switching element Q14 functioning as a commutator-side synchronous rectifier and the thirteenth switching element Q13 perform complementary operations before and after a dead period, the fourteenth switching element Q14 is in the ON state.

Operation at Time t1

Figure 20:
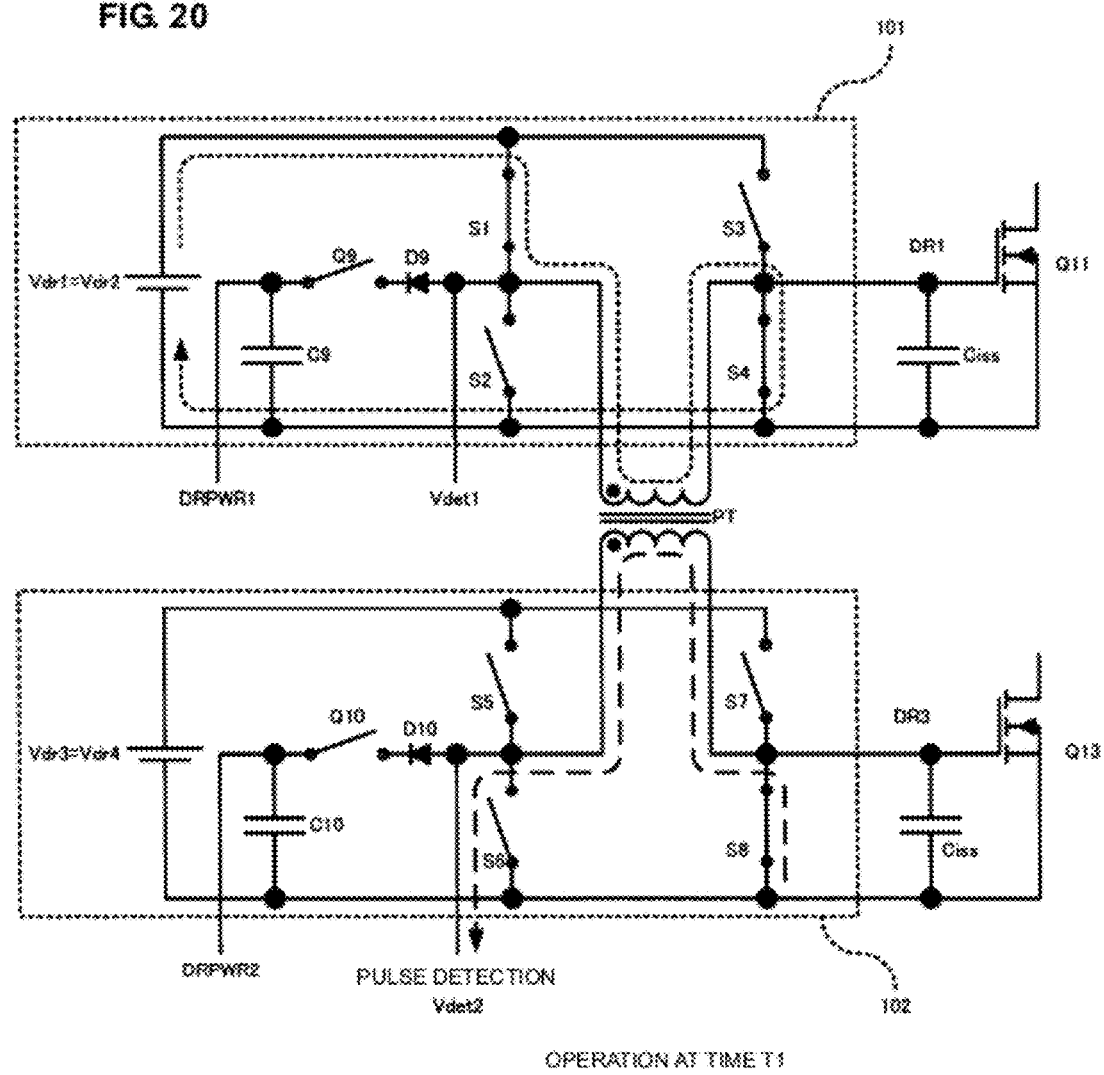
FIG. 20 is a diagram describing the internal operation of the control IC at the time t1.

FIG. 20 is a circuit block diagram describing operations of the primary-side control IC 101 and the secondary-side control IC 102 at the time t1.

At the time t1, the first switching circuit S1 in the primary-side control IC 101 is turned on. As a result, a current supplied from the first direct-current voltage portion Vdr1 flows via the first switching circuit S1, the primary winding Np2 of the timing signal transmission transformer PT, and the fourth switching circuit S4. When the primary winding Np2 of the timing signal transmission transformer PT is energized, a voltage is generated at the secondary winding Ns2 of the timing signal transmission transformer PT. Accordingly, a positive pulse voltage is generated at the secondary winding voltage detection unit Vdet2 that is located at the node between the fifth switching circuit S5 and the sixth switching circuit S6 and is detected by the secondary winding voltage detection unit Vdet2.

Operation in Period from Time t1 to Time t2

Figure 21:
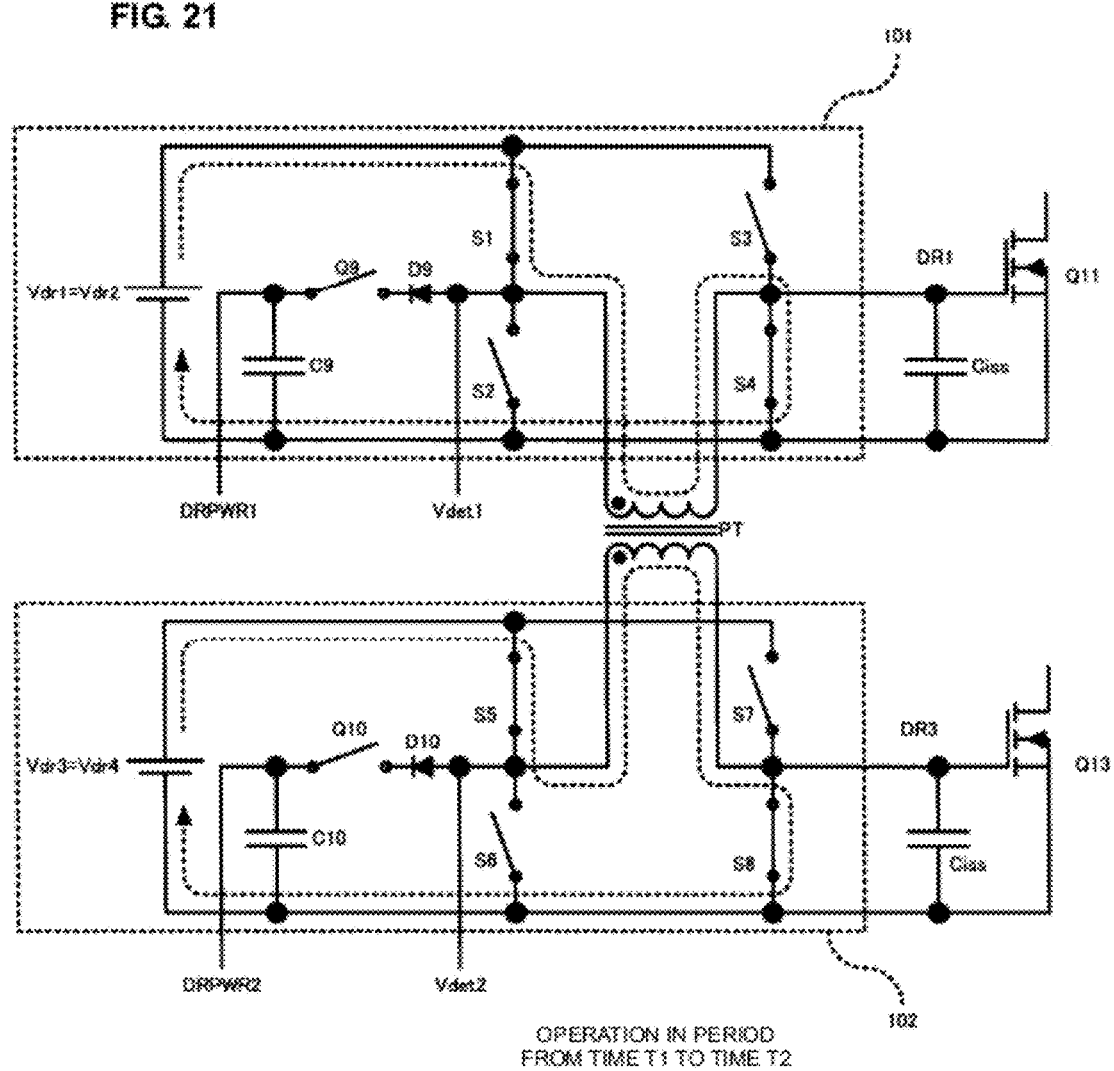
FIG. 21 is a diagram describing the internal operation of the control IC in a period from the time t1 to a time t2.

FIG. 21 is a circuit block diagram describing operations of the primary-side control IC 101 and the secondary-side control IC 102 in the period from the time t1 to the time t2.

When a voltage is input into the secondary winding voltage detection unit Vdet2, the digital control unit in the secondary-side control IC 102 turns on the fifth switching circuit S5. As a result, a current supplied from the fourth direct-current voltage portion Vdr4 of the secondary-side control IC 102 flows via the fifth switching circuit S5, the secondary winding Ns2 of the timing signal transmission transformer PT, and the eighth switching circuit S8.

Operation at Time t2

Figure 22:
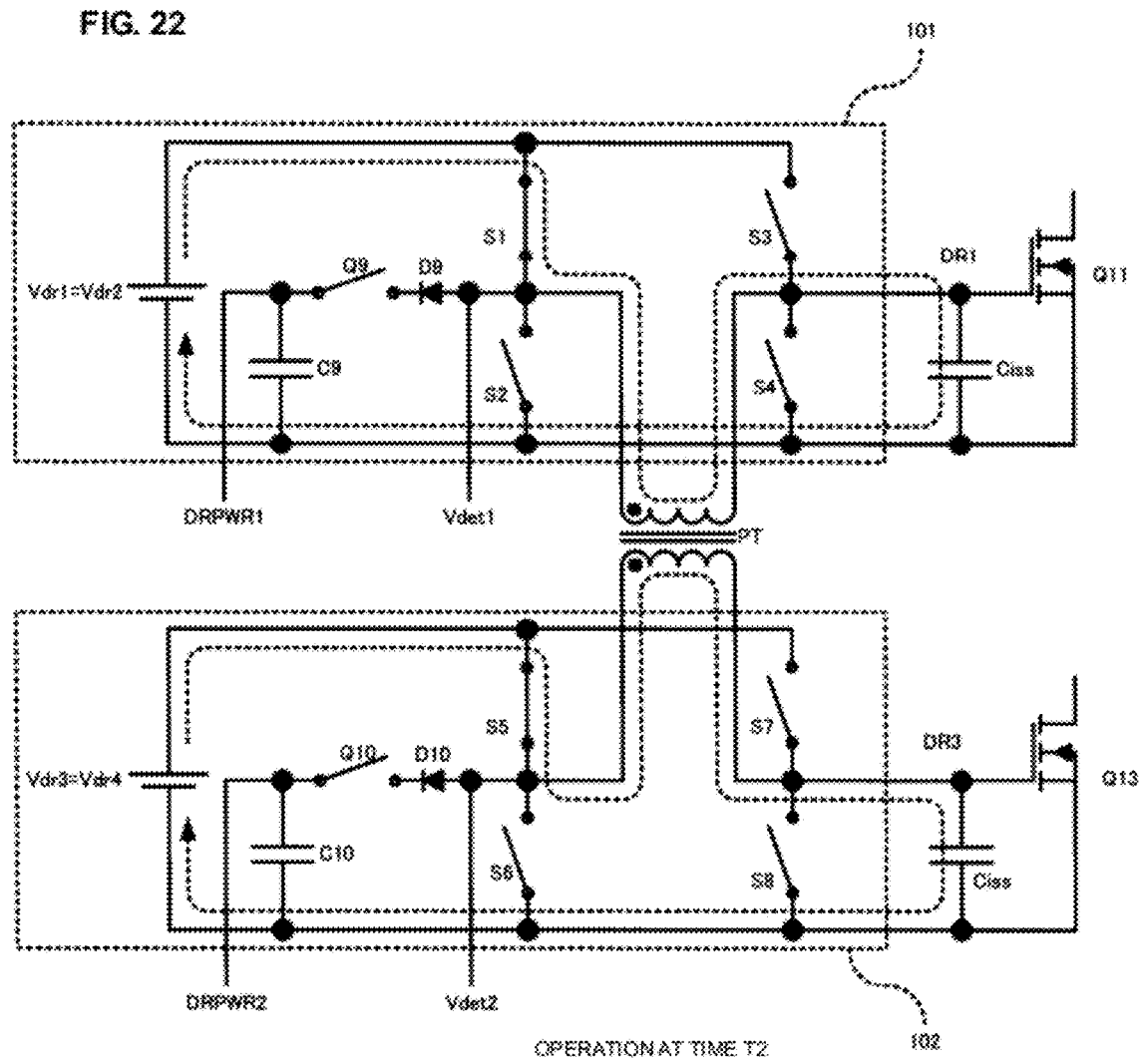
FIG. 22 is a diagram describing the internal operation of the control IC at the time t2.

FIG. 22 is a circuit block diagram describing operations of the primary-side control IC 101 and the secondary-side control IC 102 at the time t2.

At the time t2, the digital control unit in the primary-side control IC 101 and the digital control unit in the secondary-side control IC 102 turn off the fourth switching circuit S4 and the eighth switching circuit S8, respectively. As a result, a current supplied from the first direct-current voltage portion Vdr1 of the primary-side control IC 101 passes through the input capacitor Ciss in the eleventh switching element Q11, an electric charge is stored in the input capacitor Ciss, and the eleventh switching element Q11 is turned on. At the same time, a current supplied from the fourth direct-current voltage portion Vdr4 of the secondary-side control IC 102 passes through the input capacitor Ciss in the thirteenth switching element Q13, an electric charge is stored in the input capacitor Ciss, and the thirteenth switching element Q13 is turned on.

Operation in Period from Time t2 to Time t3

Figure 23:
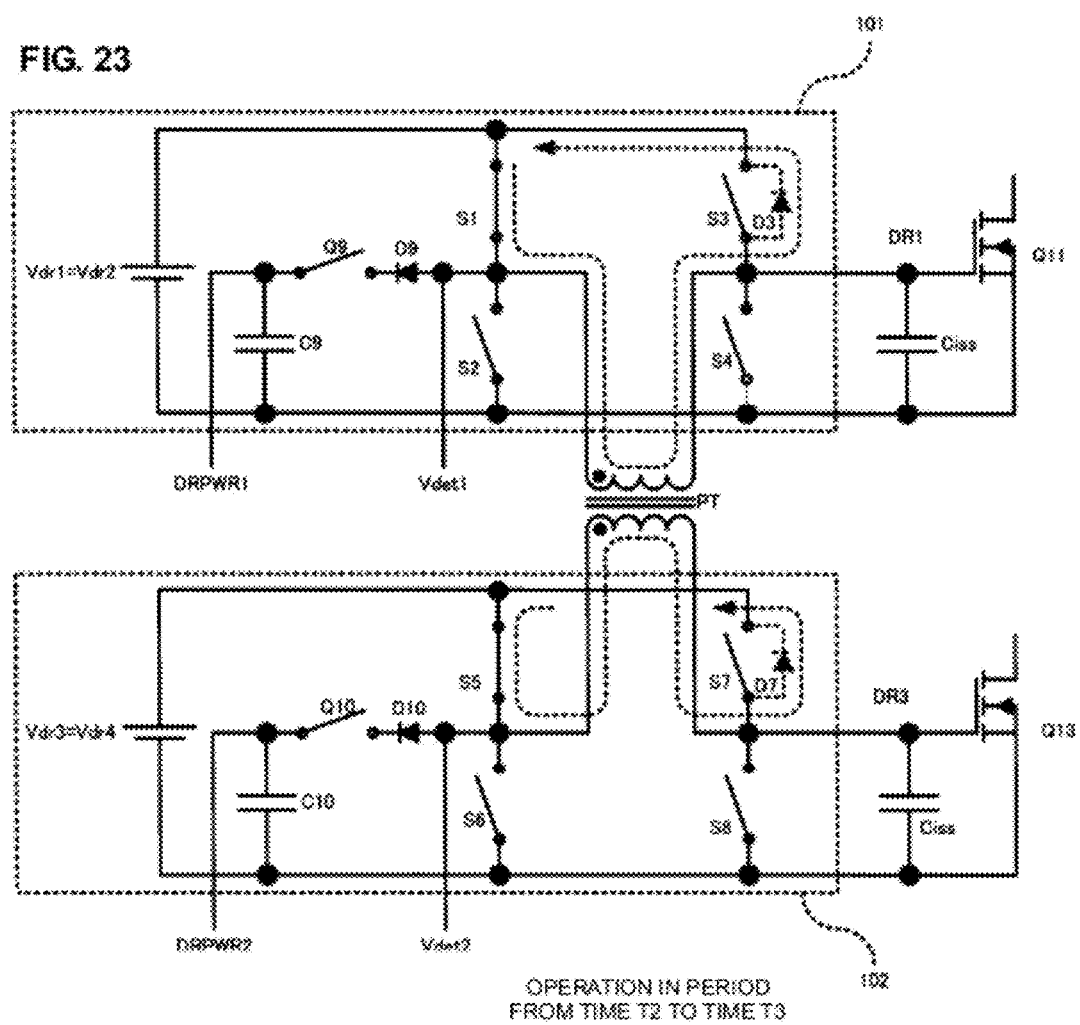
FIG. 23 is a diagram describing the internal operation of the control IC in a period from the time t2 to a time t3.

FIG. 23 is a circuit block diagram describing operations of the primary-side control IC 101 and the secondary-side control IC 102 in the period from the time t2 to the time t3.

In the period from the time t2 to the time t3, when the ON periods of the eleventh switching element Q11 and the thirteenth switching element Q13 end, the current that has been supplied from the first direct-current voltage portion Vdr1 of the primary-side control IC 101 reflows to the first direct-current voltage portion Vdr1 via the first switching circuit S1, the primary winding Np2 of the timing signal transmission transformer PT, and the third diode D3 and the current that has been supplied from the fourth direct-current voltage portion Vdr4 of the secondary-side control IC 102 reflows to the fourth direct-current voltage portion Vdr4 via the fifth switching circuit S5, the secondary winding Ns2 of the timing signal transmission transformer PT, and the seventh diode D7.

Operation in Period from Time t3 to Time t4

Figure 24:
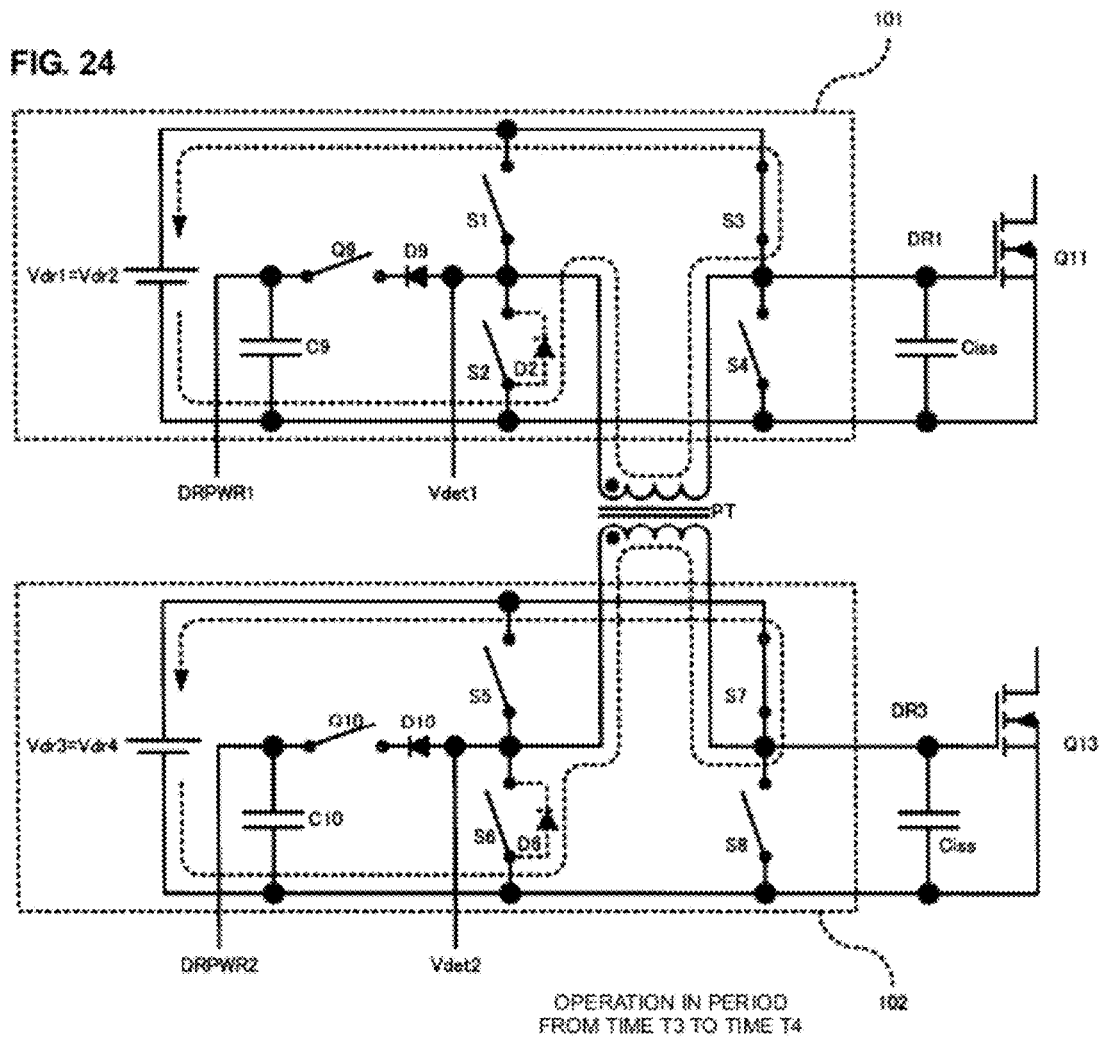
FIG. 24 is a diagram describing the internal operation of the control IC in a period from the time t3 to a time t4.

FIG. 24 is a circuit block diagram describing operations of the primary-side control IC 101 and the secondary-side control IC 102 in the period from the time t3 to the time t4.

At the time t3, the first switching circuit S1 in the primary-side control IC 101 and the fifth switching circuit S5 in the secondary-side control IC 102 are turned off. As a result, in the period from the time t3 to the time t4, a current flows via the second diode D2, the primary winding Np2 of the timing signal transmission transformer PT, and the third diode D3 while decreasing at the primary winding Np2 in the primary-side control IC 101, and a current flows via a sixth diode D6, the secondary winding Ns2 of the timing signal transmission transformer PT, and the seventh diode D7 while decreasing at the secondary winding Ns2 in the secondary-side control IC 102. Electromagnetic energy stored in the timing signal transmission transformer PT is regenerated.

Operation in Period from Time t4 to Time t5

Figure 25:
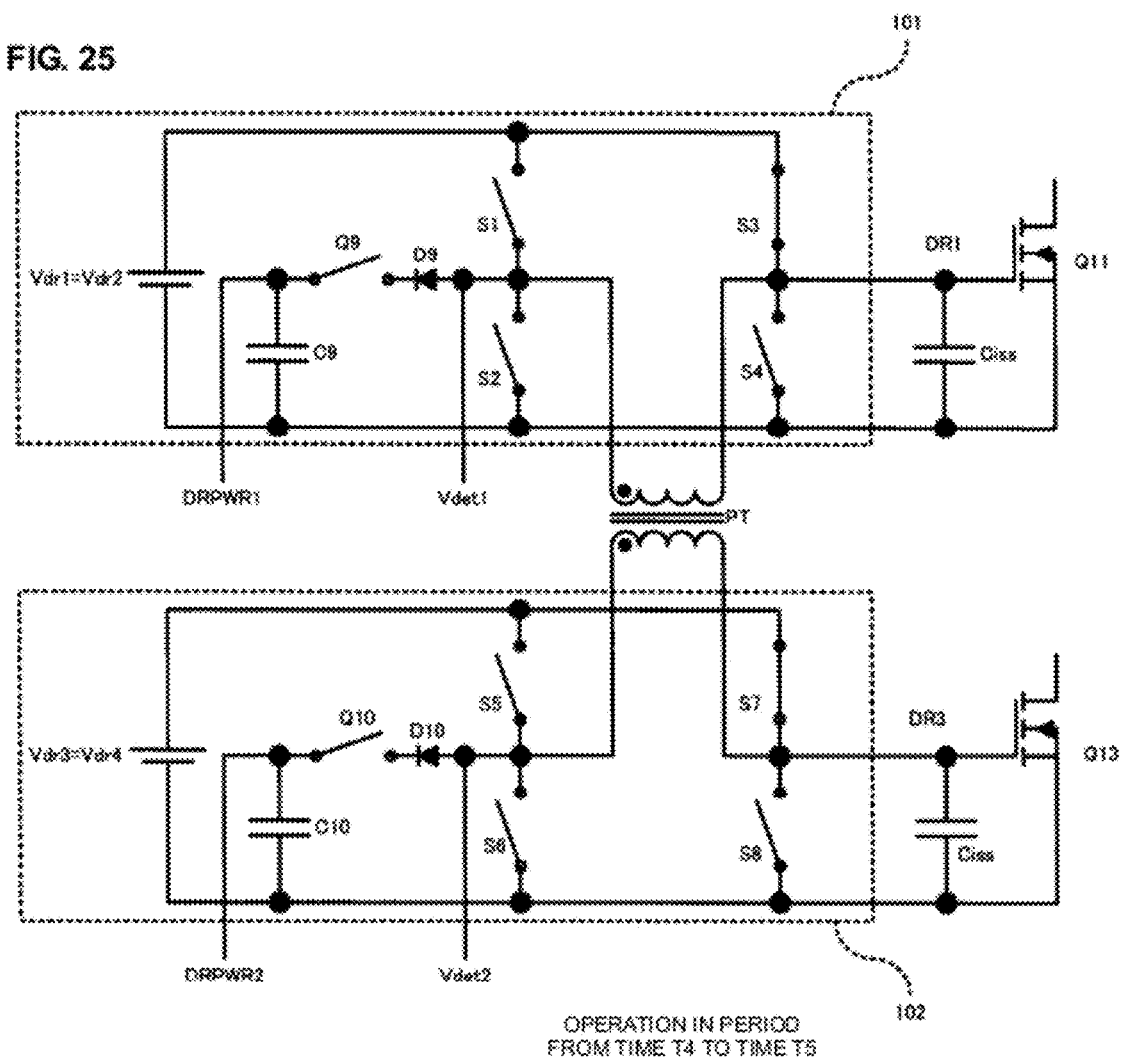
FIG. 25 is a diagram describing the internal operation of the control IC in a period from the time t4 to a time t5.

FIG. 25 is a circuit block diagram describing operations of the primary-side control IC 101 and the secondary-side control IC 102 in the period from the time t4 to the time t5.

At the time t4, the current passing through the primary winding Np2 and the secondary winding Ns2 of the timing signal transmission transformer PT becomes close to zero, no forward current passes through the second diode D2 and the third diode D3 in the primary-side control IC 101, and no forward current passes through the sixth diode D6 and the seventh diode D7 in the secondary-side control IC 102. Subsequently, the third switching circuit S3 in the primary-side control IC 101 and the seventh switching circuit S7 in the secondary-side control IC 102 are turned on. As a result, the gate potentials of the eleventh switching element Q11 and the thirteenth switching element Q13 are maintained at values of voltages supplied from the driving power supply terminals Vcc. That is, the eleventh switching element Q11 and the thirteenth switching element Q13 are kept in the ON state.

Operation at Time t5

Figure 26:
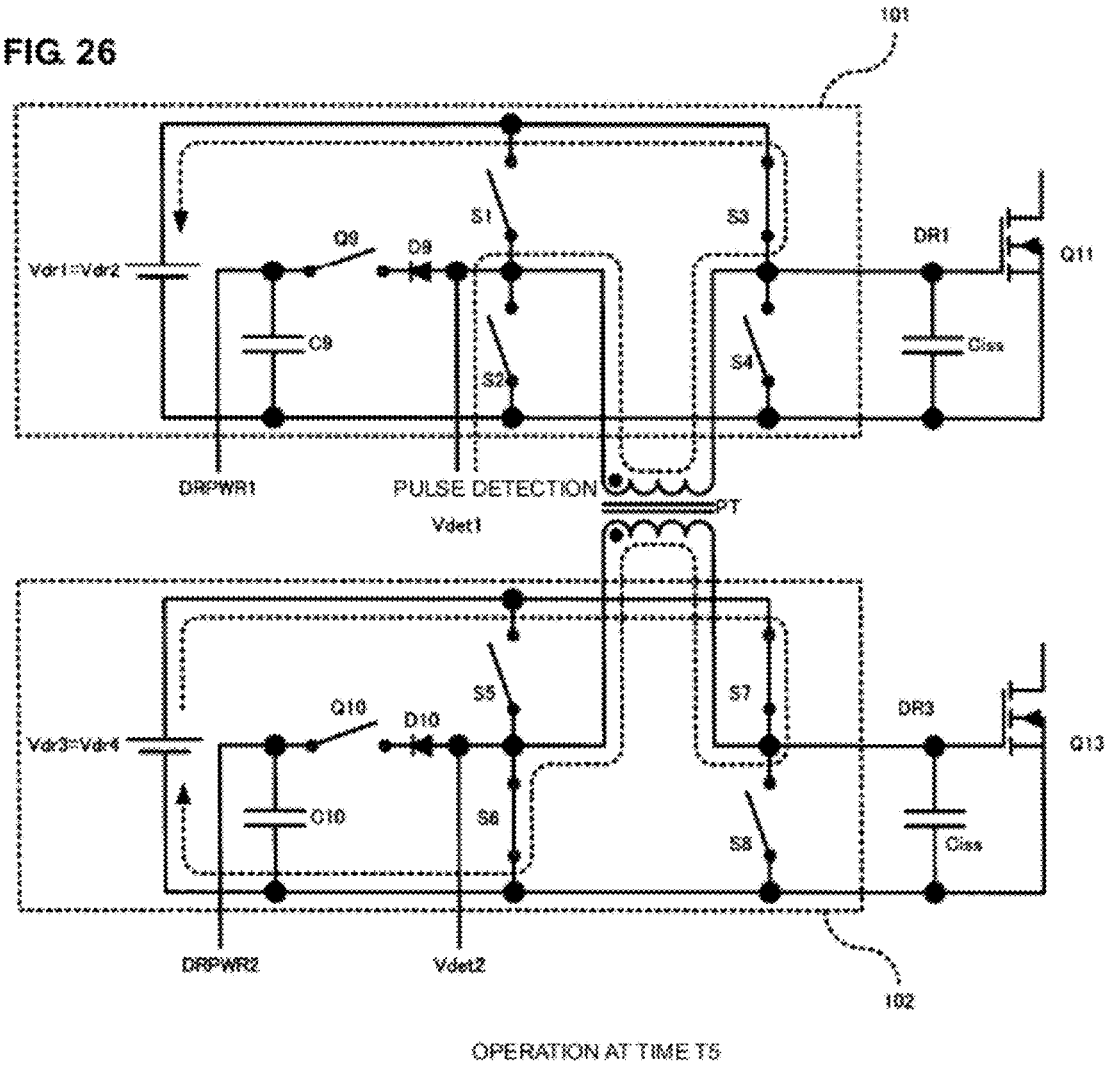
FIG. 26 is a diagram describing the internal operation of the control IC at the time t5.

FIG. 26 is a circuit block diagram describing operations of the primary-side control IC 101 and the secondary-side control IC 102 at the time t5.

At the time t5, the sixth switching circuit S6 in the secondary-side control IC 102 is turned on. As a result, a current supplied from the third direct-current voltage portion Vdr3 flows via the seventh switching circuit S7, the secondary winding Ns2 of the timing signal transmission transformer PT, and the sixth switching circuit S6. When the secondary winding Ns2 of the timing signal transmission transformer PT is energized, a voltage is generated at the primary winding Np2 of the timing signal transmission transformer PT. Accordingly, in the primary-side control IC 101, a negative pulse voltage is generated at the winding voltage detection unit Vdet1 that is located at the node between the first switching circuit S1 and the second switching circuit S2 and is detected by the winding voltage detection unit Vdet1.

Operation in Period from Time t5 to Time t6

Figure 27:
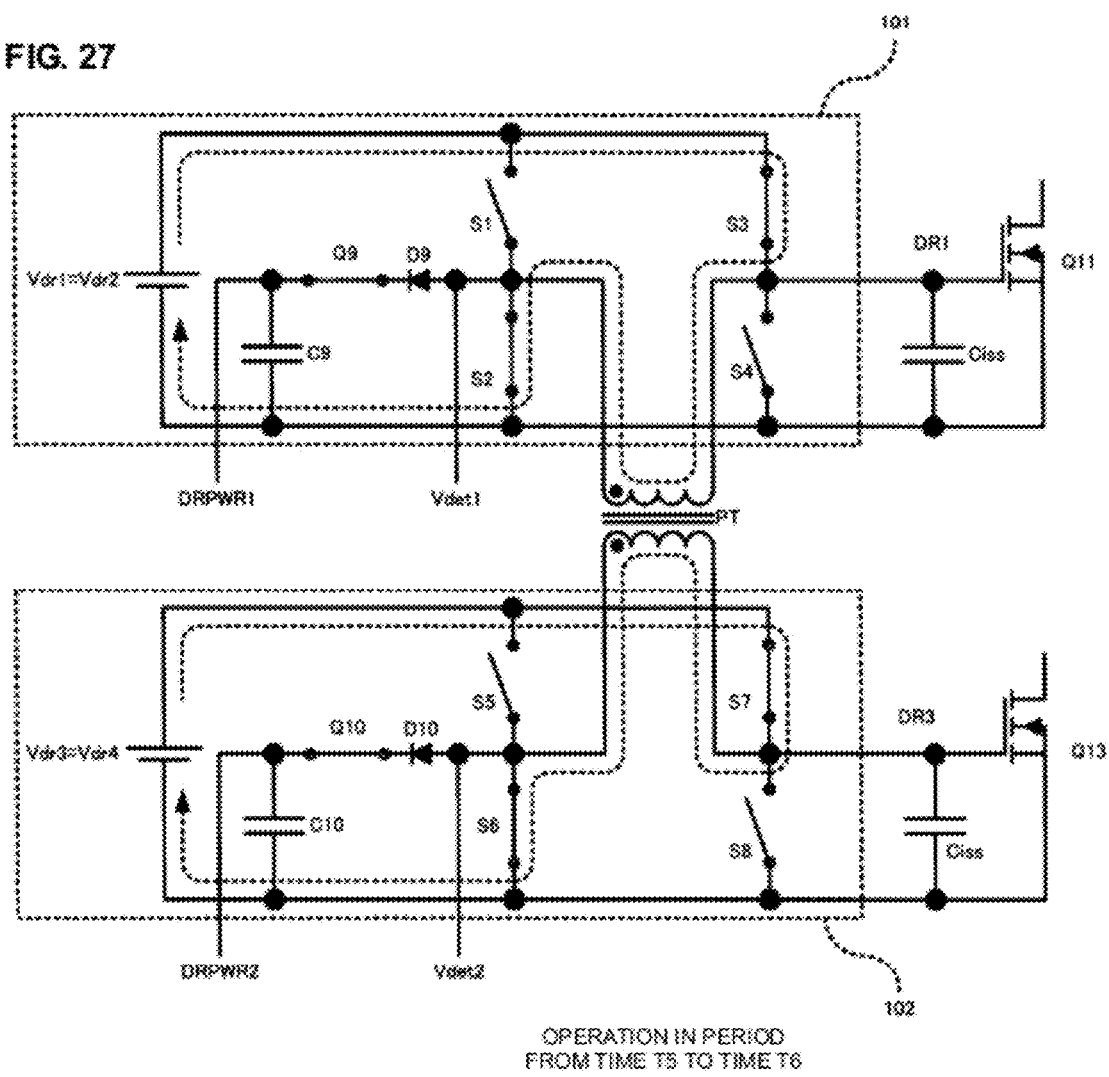
FIG. 27 is a diagram describing the internal operation of the control IC in a period from the time t5 to a time t6.

FIG. 27 a circuit block diagram describing operations of the primary-side control IC 101 and the secondary-side control IC 102 in the period from the time t5 to the time t6.

When a voltage is input into the winding voltage detection unit Vdet1, the digital control unit in the primary-side control IC 101 turns on the second switching circuit S2. As a result, a current supplied from the second direct-current voltage portion Vdr2 of the primary-side control IC 101 flows via the third switching circuit S3, the primary winding Np2 of the timing signal transmission transformer PT, and the second switching circuit S2.

During this period, the ninth switching circuit S9 and the tenth switching circuit S10 are also turned on. The amount of electromagnetic energy stored in the timing signal transmission transformer PT can be changed by adjusting the length of the period from the time t5 to the time t6. Accordingly, by adjusting the length of the period from the time t5 to the time t6, driving voltages to be supplied to the digital control units in the primary-side control IC 101 and the secondary-side control IC 102 can be controlled.

Operation at Time t6

Figure 28:
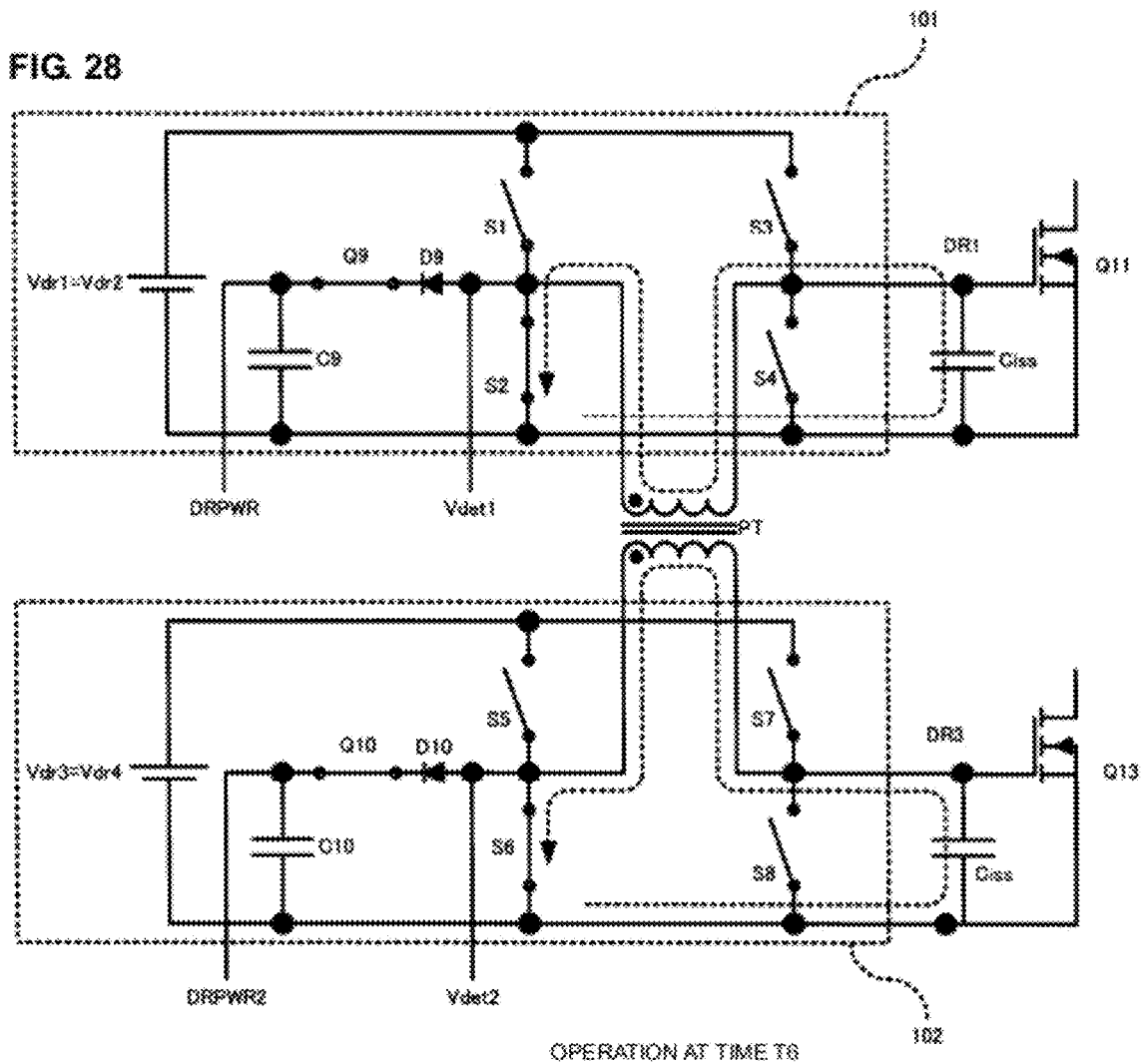
FIG. 28 is a diagram describing the internal operation of the control IC at the time t6.

FIG. 28 is a circuit block diagram describing operations of the primary-side control IC 101 and the secondary-side control IC 102 at the time t6. At the time t6, the digital control unit in the primary-side control IC 101 and the digital control unit in the secondary-side control IC 102 turn off the third switching circuit S3 and the seventh switching circuit S7, respectively. As a result, an electric charge stored in the input capacitor Ciss in the eleventh switching element Q11 is discharged, and the eleventh switching element Q11 is turned off. At the same time, an electric charge stored in the input capacitor Ciss in the thirteenth switching element Q13 is discharged, and the thirteenth switching element Q13 is turned off.

Operation in Period from Time t6 to Time t7

Figure 29:
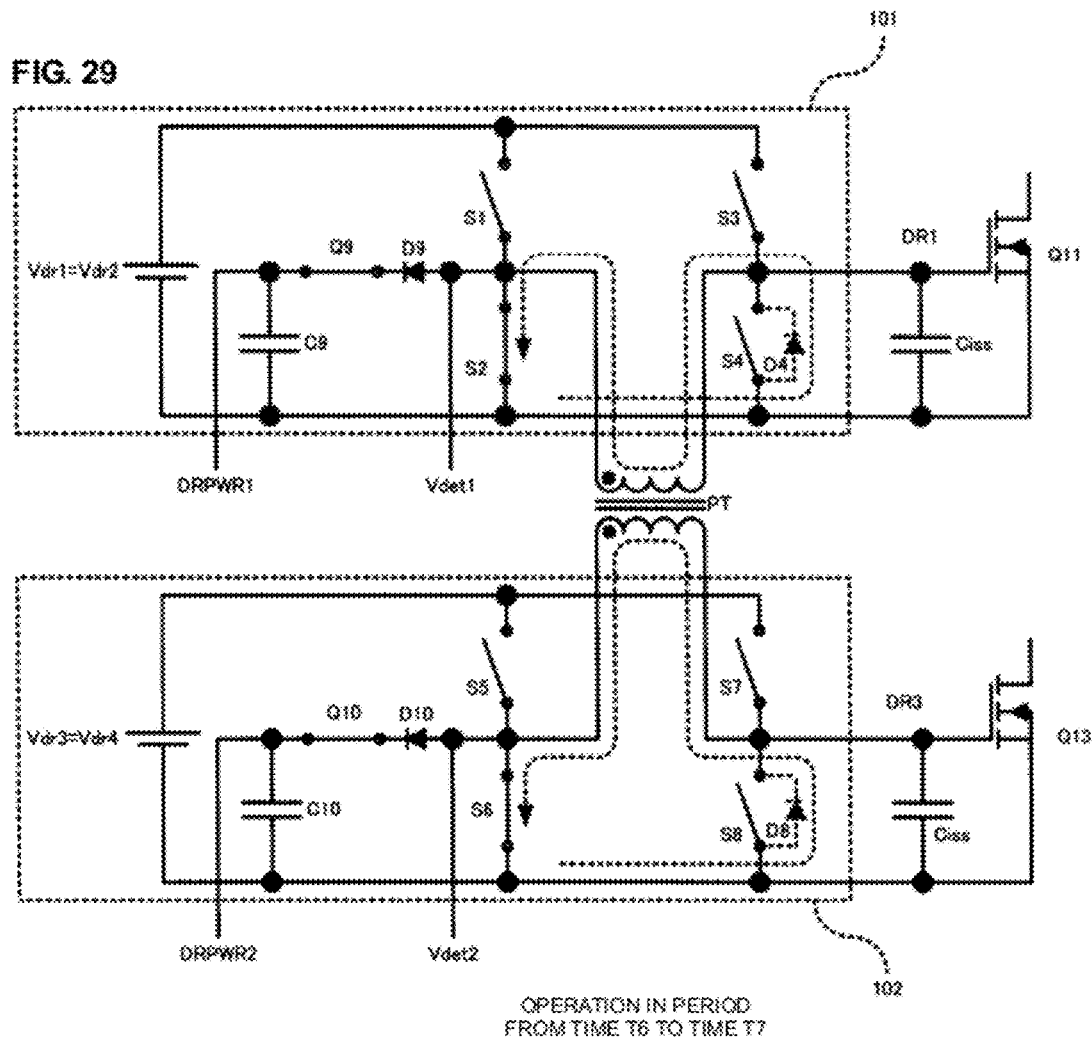
FIG. 29 is a diagram describing the internal operation of the control IC in a period from the time t6 to a time t7.

FIG. 29 is a circuit block diagram describing operations of the primary-side control IC 101 and the secondary-side control IC 102 in the period from the time t6 to the time t7.

In the period from the time t6 to the time t7, when the gate-to-source voltages of the eleventh switching element Q11 and the thirteenth switching element Q13 reach approximately 0 V, a current reflows to the ground terminal GND of the primary-side control IC 101 via the fourth diode D4, the primary winding Np2 of the timing signal transmission transformer PT, and the second switching circuit S2 and a current reflows to the ground terminal GND of the secondary-side control IC 102 via the eighth diode D8, the secondary winding Ns2 of the timing signal transmission transformer PT, and the sixth switching circuit S6.

Operation in Period from Time t7 to Time t8

Figure 30:
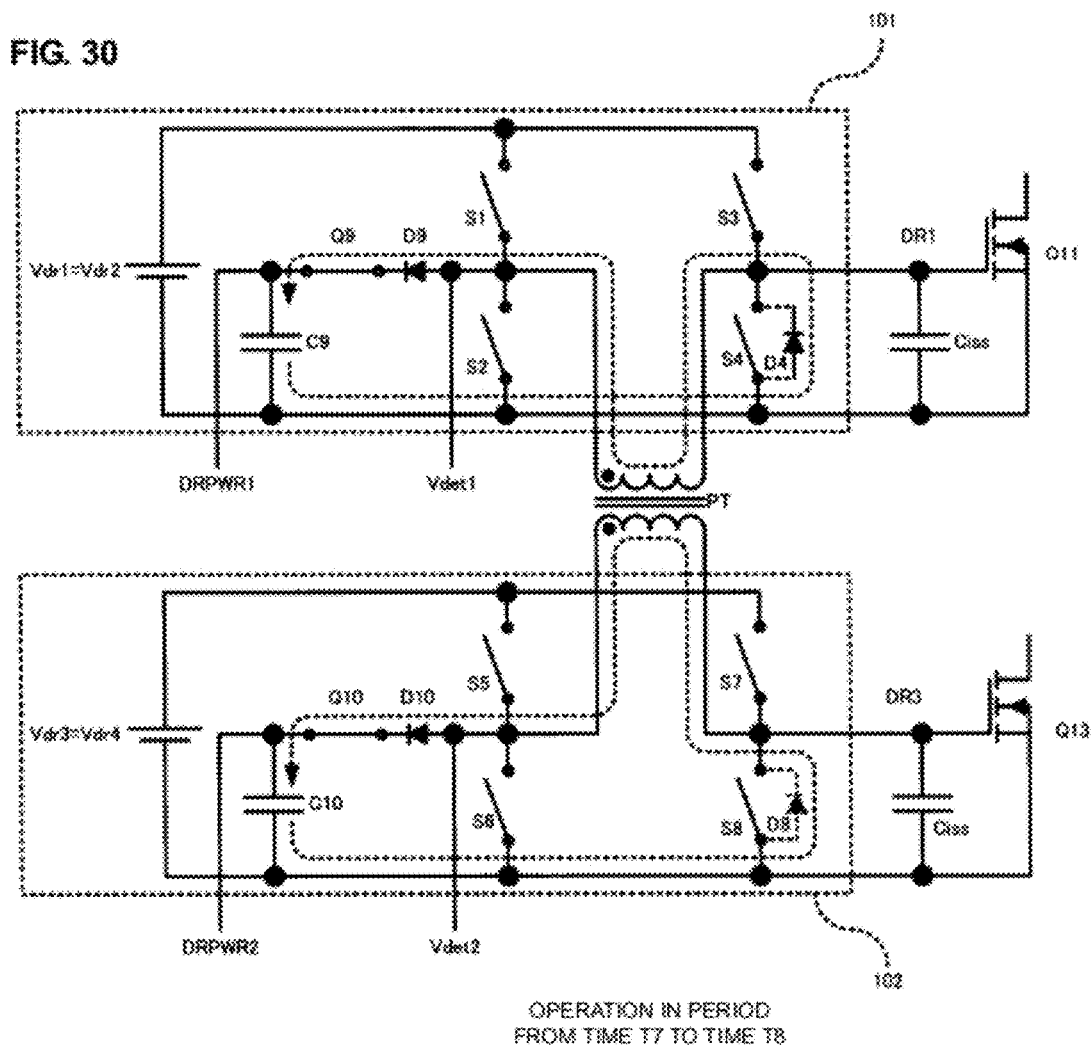
FIG. 30 is a diagram describing the internal operation of the control IC in a period from the time t7 to a time t8.

FIG. 30 is a circuit block diagram describing operations of the primary-side control IC 101 and the secondary-side control IC 102 in the period from the time t7 to the time t8. At the time t7, the fourth switching circuit S4 in the primary-side control IC 101 and the eighth switching circuit S8 in the secondary-side control IC 102 are turned on and the second switching circuit S2 in the primary-side control IC 101 and the sixth switching circuit S6 in the secondary-side control IC 102 are turned off. As a result, in the period from the time t7 to the time t8, a current flows via the fourth diode D4, the primary winding Np2 of the timing signal transmission transformer PT, and the ninth diode D9 while decreasing at the primary winding Np2 in the primary-side control IC 101 so that the seventh capacitor C7 is charged, and a current flows via the eighth diode D8, the secondary winding Ns2 of the timing signal transmission transformer PT, and the tenth diode D10 while decreasing at the secondary winding Ns2 in the secondary-side control IC 102 so that the eighth capacitor C8 is charged.

In the above-described operations, it is possible to regenerate driving energy for the eleventh switching element Q11 and the thirteenth switching element Q13 as driving energy for the digital control circuits in the primary-side control IC 101 and the secondary-side control IC 102. When the ninth switching circuit S9 and the tenth switching circuit S10 are turned off during this period, energy used to charge the seventh capacitor C7 and the eighth capacitor C8 can be controlled. Subsequently, electromagnetic energy that has yet to be regenerated from the timing signal transmission transformer PT at the time of deactivation of the ninth switching circuit S9 and the tenth switching circuit S10 is regenerated to the first direct-current voltage portion Vdr1 and the third direct-current voltage portion Vdr3 via the first diode D1 and the fifth diode D5. According to the second preferred embodiment, it is also possible to keep values of voltages at the fifth direct-current voltage portion DRPWR1 and the sixth direct-current voltage portion DRPWR2 at target values.

Operation after Time t8

An operation in a period from the time t8 to the time t1 is substantially the same as that in the period from the time t0 to the time t1.

In the above-described operations, the effects and advantages described in the first preferred embodiment can be obtained. In addition, regenerated energy can be used as a driving voltage for a digital control unit in a control IC. That is, when gate driving voltages for the eleventh switching element Q11, the twelfth switching element Q12, the thirteenth switching element Q13, and the fourteenth switching element Q14 are, for example, approximately 10 V and driving voltages for the digital control units in the primary-side control IC 101 and the secondary-side control IC 102 are, for example, approximately 1.8 V, a predetermined voltage can be generated not by a linear regulator for performing stepping down a voltage but by a switching regulator by using an excitation inductance of the timing signal transmission transformer PT as an energy storage element. This leads to the increase in circuit efficiency. The timing signal transmission transformer PT is used not only to transmit a signal between the primary side and the secondary side but also as an energy storage element. In addition, the first switching circuit S1 to the tenth switching circuit S10, drive circuits, and control circuits are integrated. Accordingly, a circuit configuration can be simplified as compared with a case in which a switching regulator is disposed.

According to the second preferred embodiment, the above-described effects and advantages are achieved.

Third Preferred Embodiment

Figure 31:
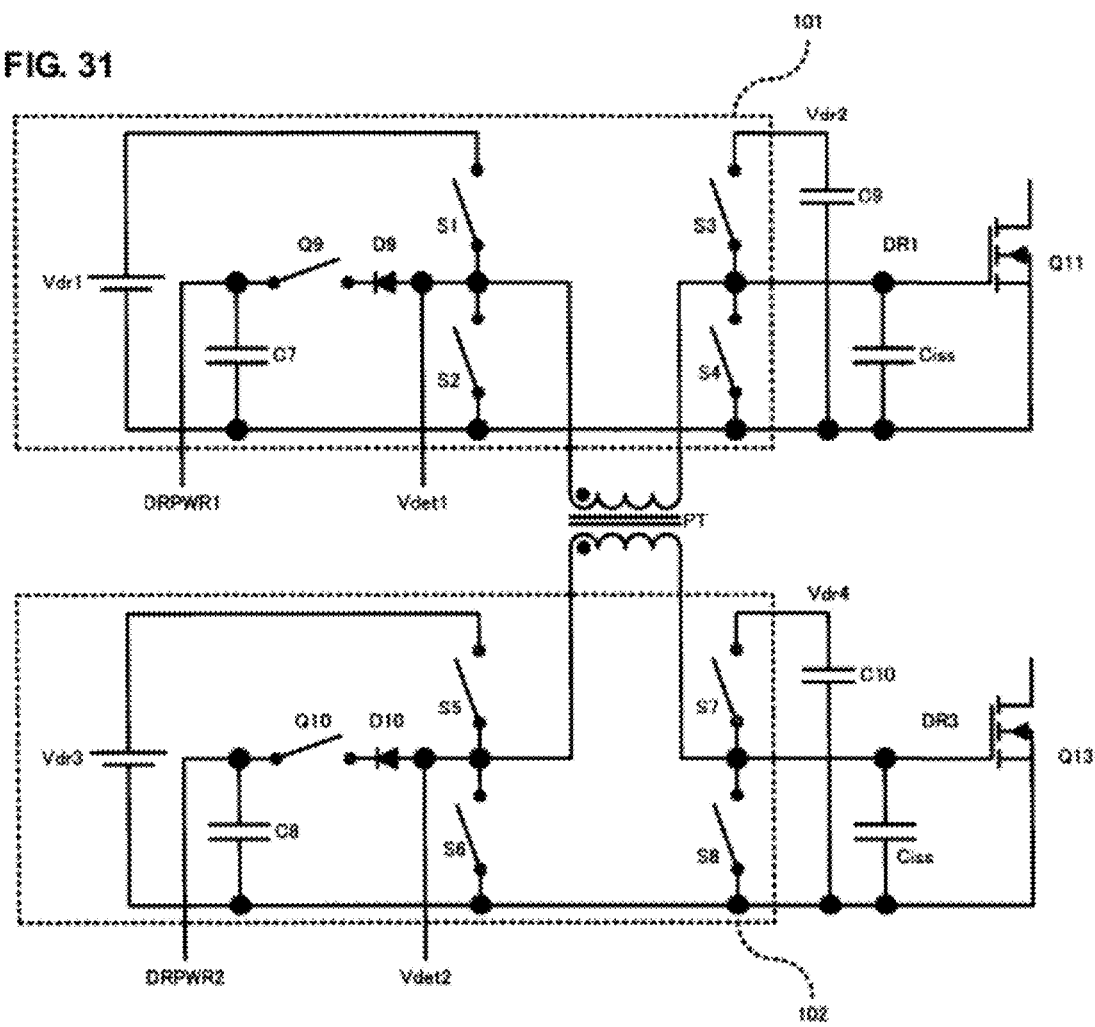
FIG. 31 is an internal block diagram of control ICs according to a third preferred embodiment of the present invention.

FIG. 31 is a circuit diagram of an isolated DC-DC converter according to the third preferred embodiment of the present invention including the control IC illustrated in FIG. 2.

The difference between the isolated DC-DC converter according to the second preferred embodiment illustrated in FIG. 17 and the isolated DC-DC converter according to the third preferred embodiment illustrated in FIG. 31 is that the second direct-current voltage portion Vdr2 of the primary-side control IC 101 and the fourth direct-current voltage portion Vdr4 of the secondary-side control IC 102 are not connected to the driving power supply terminal Vcc and are connected to a ninth capacitor C9 and a tenth capacitor C10, respectively. For example, in the primary-side control IC 101 illustrated in FIG. 31, when the ON period of the fourth switching circuit S4 is changed while the first switching circuit S1 is in the ON state, a circuit including the first direct-current voltage portion Vdr1, the excitation inductance of the timing signal transmission transformer PT, the fourth switching circuit S4, the third switching circuit S3, and the ninth capacitor C9 becomes a step-up chopper converter. That is, even when a very variable direct-current voltage is supplied from the first direct-current voltage portion Vdr1, it is possible to stabilize a value of a voltage applied to the first drive signal output terminal DR1 by controlling the ON period of the fourth switching circuit S4. This method can also be performed in the secondary-side control IC 102.

According to the third preferred embodiment, the above-described effects and advantages are achieved.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. An isolated switching power supply apparatus comprising:
a direct-current input power supply;
a power transmission transformer including a primary winding and a secondary winding;
at least one main switching element configured to perform switching control on a direct-current voltage applied to the primary winding of the power transmission transformer;
a rectification circuit that includes at least one rectification switching element and is connected to the secondary winding of the power transmission transformer;
a smoothing circuit connected to the secondary winding of the power transmission transformer;
a power conversion circuit configured to obtain an output voltage from the smoothing circuit; and
a control circuit configured to control an operation of the power conversion circuit; wherein an input/output conversion ratio is controlled in accordance with a duty ratio of the at least one main switching element;
the control circuit includes a timing signal transmission transformer that is connected between a primary controller and a secondary controller and includes a primary winding and a secondary winding;
the primary controller includes at least one primary drive switch configured to drive the timing signal transmission transformer, a primary digital control unit configured to control a time of driving of the at least one primary drive switch, and a primary winding voltage detection unit configured to detect a change in voltage output from the timing signal transmission transformer;
the secondary controller includes at least one secondary drive switch configured to drive the timing signal transmission transformer, a secondary digital control unit configured to control a time of driving of the at least one secondary drive switch, and a secondary winding voltage detection unit configured to detect a change in voltage output from the timing signal transmission transformer;
a pulse signal is generated by the at least one primary drive switch or the at least one secondary drive switch when or immediately before the main switching element is turned on or off, and is transmitted from one of a primary circuit and a secondary circuit to the other one of the primary circuit and the secondary circuit by the timing signal transmission transformer; and
the at least one primary drive switch, the at least one secondary drive switch, and the timing signal transmission transformer define an auxiliary switching power supply circuit, the timing signal transmission transformer defines a reactance element in the auxiliary switching power supply circuit, and the auxiliary switching power supply circuit performs voltage conversion or regeneration of driving energy of the main switching element.

2. The isolated switching power supply apparatus according to claim 1, wherein the primary controller or the secondary controller includes a first direct-current voltage portion and a second direct-current voltage portion having different voltage values, and a direct-current voltage is supplied from the first direct-current voltage portion to the auxiliary switching power supply circuit, is subjected to voltage conversion in the auxiliary switching power supply circuit, and is input into the second direct-current voltage portion.

3. The isolated switching power supply apparatus according to claim 2, wherein a lower one of voltages at the first direct-current voltage portion and the second direct-current voltage portion is supplied to the primary digital control unit or the secondary digital control unit.

4. The isolated switching power supply apparatus according to claim 2, wherein the primary controller includes a first series circuit and a second series circuit, the first series circuit including a first switching circuit and a second switching circuit, the second series circuit including a third switching circuit and a fourth switching circuit, the primary digital control unit controls turning on/off of the first to fourth switching circuits, one end of the first series circuit is connected to the first direct-current voltage portion, and the other end of the first series circuit is connected to a reference potential of a predetermined primary circuit, one end of the second series circuit is connected to the second direct-current voltage portion, and the other end of the second series circuit is connected to the reference potential of the predetermined primary circuit, and the primary winding of the timing signal transmission transformer is connected between a node between the first switching circuit and the second switching circuit and a node between the third switching circuit and the fourth switching circuit.

5. The isolated switching power supply apparatus according to claim 4, wherein a series circuit including a first diode and a ninth switching circuit is connected between a fifth direct-current voltage portion and the node between the first switching circuit and the second switching circuit, and while driving energy for the main switching element is regenerated, power to be regenerated is obtained from the series circuit and is supplied to the fifth direct-current voltage portion.

6. The isolated switching power supply apparatus according to claim 5, wherein power obtained from the fifth direct-current voltage portion is used as driving power for the digital control unit in the primary controller.

7. The isolated switching power supply apparatus according to claim 2, wherein the secondary controller includes a third series circuit and a fourth series circuit, the third series circuit including a fifth switching circuit and a sixth switching circuit, the fourth series circuit including a seventh switching circuit and an eighth switching circuit, the secondary digital control unit controls turning on/off of the fifth to eighth switching circuits, one end of the third series circuit is connected to a third direct-current voltage portion, and the other end of the third series circuit is connected to a reference potential of a predetermined secondary circuit, one end of the fourth series circuit is connected to a fourth direct-current voltage portion, and the other end of the fourth series circuit is connected to the reference potential of the predetermined secondary circuit, and the secondary winding of the timing signal transmission transformer is connected between a node between the fifth switching circuit and the sixth switching circuit and a node between the seventh switching circuit and the eighth switching circuit.

8. The isolated switching power supply apparatus according to claim 7, wherein a series circuit including a second diode and a tenth switching circuit is connected between a sixth direct-current voltage portion and the node between the fifth switching circuit and the sixth switching circuit, and while driving energy for the rectification switching element is regenerated, power to be regenerated is obtained from the series circuit and is supplied to the sixth direct-current voltage portion.

9. The isolated switching power supply apparatus according to claim 8, wherein power obtained from the sixth direct-current voltage portion is used as driving power for the digital control unit in the secondary controller.

10. The isolated switching power supply apparatus according to claim 1, wherein the main switching element is connected to the primary controller, the rectification switching element is connected to the secondary controller, at least one of the main switching element and the rectification switching element is a field effect transistor, and the auxiliary switching power supply circuit regenerates at least a portion of driving energy of the main switching element or the rectification switching element by performing voltage resonant switching.

11. The isolated switching power supply apparatus according to claim 1, wherein the isolated switching power supply apparatus is a forward converter, the rectification switching element includes a first synchronous rectifier and a second synchronous rectifier, and the second synchronous rectifier is turned off immediately before the main switching element is turned on.

12. The isolated switching power supply apparatus according to claim 11, further comprising an active clamping circuit that is connected in parallel to the primary winding of the power transmission transformer or the main switching element and is a series circuit including a resonant capacitor and an auxiliary switching element, and the digital control unit in the primary controller controls the auxiliary switching element so that the auxiliary switching element and the main switching element perform complementary operations before and after a dead period.

* * * * *